United States Patent
Langley

(10) Patent No.: US 10,624,353 B1
(45) Date of Patent: Apr. 21, 2020

(54) PIZZA OVEN

(71) Applicant: John Langley, New Orleans, LA (US)

(72) Inventor: John Langley, New Orleans, LA (US)

(*) Notice: Subject to any disclaimer, the term of this patent is extended or adjusted under 35 U.S.C. 154(b) by 816 days.

(21) Appl. No.: 15/068,858

(22) Filed: Mar. 14, 2016

Related U.S. Application Data

(60) Provisional application No. 62/197,968, filed on Jul. 28, 2015, provisional application No. 62/132,060, filed on Mar. 12, 2015.

(51) Int. Cl.
| | | |
|---|---|---|
| A21B 1/52 | (2006.01) | |
| F24C 15/30 | (2006.01) | |
| F24C 3/14 | (2006.01) | |
| F24C 7/10 | (2006.01) | |
| F24C 15/16 | (2006.01) | |
| A21B 1/02 | (2006.01) | |
| A21B 1/36 | (2006.01) | |
| A21B 1/33 | (2006.01) | |
| A21B 1/40 | (2006.01) | |
| A21B 1/42 | (2006.01) | |
| A21B 3/10 | (2006.01) | |

(52) U.S. Cl.
CPC .......... *A21B 1/52* (2013.01); *A21B 1/02* (2013.01); *A21B 1/33* (2013.01); *A21B 1/36* (2013.01); *A21B 1/40* (2013.01); *A21B 1/42* (2013.01); *A21B 3/10* (2013.01); *F24C 3/14* (2013.01); *F24C 7/10* (2013.01); *F24C 15/16* (2013.01); *F24C 15/30* (2013.01)

(58) Field of Classification Search
None
See application file for complete search history.

(56) References Cited

U.S. PATENT DOCUMENTS

| | | | | | |
|---|---|---|---|---|---|
| 1,335,844 A | * | 4/1920 | Lightle | ............... | F24C 15/16 |
| | | | | | 126/338 |
| 1,351,394 A | * | 8/1920 | Baird | ............... | F24C 15/16 |
| | | | | | 126/337 R |

(Continued)

FOREIGN PATENT DOCUMENTS

| | | | | |
|---|---|---|---|---|
| BE | 893177 | 8/1982 | | |
| FR | 2670870 | 6/1992 | | |
| JP | 2004208617 A | * | 7/2004 | ............... A21B 1/44 |

*Primary Examiner* — Avinash A Savani
*Assistant Examiner* — Martha M Becton
(74) *Attorney, Agent, or Firm* — Garvey, Smith & Nehrbass, Patent Attorneys, L.L.C.; Seth M. Nehrbass; Fabian M. Nehrbass

(57) ABSTRACT

The present invention relates to a small, lightweight, portable or easily removable high temperature oven with a rotating floor, designed to bake one pizza at a time, and operate between 300 and 1400° F., with mechanisms to independently regulate the temperature of the dome and the floor of the oven, using thermocouples, infrared sensors, other temperature sensors, industrial oven controllers, other programmable logic controllers, solenoid gas valves, or proportional response gas valves, baffles and ventilation systems and other heat sources, control sensing and regulation systems, to imitate the baking conditions of a heavy ceramic traditional Italian cupola oven. Different embodiments include portable catering ovens, food truck ovens, very small pizzeria ovens, and residential ovens with automatic controls, that are approximately conventional residential countertop depth.

11 Claims, 12 Drawing Sheets

(56) References Cited

U.S. PATENT DOCUMENTS

| | | | | |
|---|---|---|---|---|
| 1,495,862 A * | 5/1924 | Meacham | F24C 15/16 | 126/19 M |
| 1,664,443 A * | 4/1928 | Williams | A21B 1/40 | 126/19 R |
| 1,777,885 A * | 10/1930 | Houlis | A21B 1/40 | 432/188 |
| 1,786,142 A * | 12/1930 | Wyman | A21B 1/44 | 432/155 |
| 1,854,850 A * | 4/1932 | Linkenauger | A47J 37/046 | 432/34 |
| 1,876,843 A * | 9/1932 | Bolling | A21B 1/24 | 432/142 |
| 2,077,687 A * | 4/1937 | Goldbert | F24C 7/10 | 126/19 R |
| 2,168,773 A * | 8/1939 | Parr | A47J 37/046 | 99/386 |
| 2,221,870 A * | 11/1940 | Kahn | F24C 7/08 | 126/37 A |
| 2,250,860 A * | 7/1941 | Clement | A21B 3/10 | 362/354 |
| 2,372,362 A * | 3/1945 | Dawson | A47J 37/046 | 126/41 A |
| 2,372,363 A * | 3/1945 | Dawson | A47J 37/046 | 126/19 R |
| 2,556,808 A * | 6/1951 | Harris | A47J 37/046 | 99/419 |
| 2,724,764 A * | 11/1955 | Ritchie | A21B 1/44 | 126/273 R |
| 2,869,939 A * | 1/1959 | Muth | A21B 1/40 | 384/315 |
| 3,006,292 A * | 10/1961 | Hilgers | A47J 37/046 | 126/19 R |
| 3,012,496 A * | 12/1961 | Kelley | A47J 37/046 | 126/25 AA |
| 3,033,190 A * | 5/1962 | Atkinson | A47J 37/0745 | 126/25 AA |
| 3,085,497 A * | 4/1963 | Statia, Sr. | A47J 37/0745 | 126/25 AA |
| 3,095,186 A | 6/1963 | Sondy | | |
| 3,167,642 A * | 1/1965 | Reis | F24C 7/10 | 126/25 R |
| 3,267,924 A * | 8/1966 | Payne | A47J 37/06 | 126/41 R |
| 3,425,364 A * | 2/1969 | Martin, Jr. | A21B 1/26 | 432/142 |
| 3,435,754 A * | 4/1969 | Lohr | A47J 37/046 | 99/341 |
| 3,457,853 A * | 7/1969 | Morley | A47J 37/046 | 100/156 |
| 3,492,938 A * | 2/1970 | Kaffer | A47J 37/046 | 126/41 R |
| 3,503,323 A * | 3/1970 | Swetlitz | A47J 37/046 | 99/352 |
| 3,552,299 A * | 1/1971 | Patoka | A47J 37/046 | 126/41 R |
| 3,598,611 A * | 8/1971 | Swetlitz | A47J 37/046 | 426/523 |
| 3,601,037 A * | 8/1971 | Giaretta | A47J 37/046 | 126/338 |
| 3,756,140 A * | 9/1973 | Kolivas | A47J 37/046 | 99/339 |
| 3,808,402 A * | 4/1974 | Rea | A21B 1/40 | 219/408 |
| 3,830,624 A * | 8/1974 | Sperring | A21B 1/02 | 432/145 |
| 4,126,778 A | 11/1978 | Cole | | |
| 4,305,329 A * | 12/1981 | Fenoglio | A21B 1/24 | 126/41 A |
| 4,411,920 A * | 10/1983 | Fenoglio | A21B 1/24 | 219/388 |
| 4,437,396 A | 3/1984 | Plattner et al. | | |
| 4,506,652 A * | 3/1985 | Baker | A21B 1/44 | 126/21 A |
| 4,683,813 A * | 8/1987 | Schultz | A21B 1/44 | 100/144 |
| 4,805,588 A | 2/1989 | Reynolds | | |
| 4,883,944 A * | 11/1989 | Takano | A21B 1/40 | 219/492 |
| 4,919,477 A * | 4/1990 | Bingham | B60P 3/0257 | 296/22 |
| 4,924,763 A * | 5/1990 | Bingham | A21B 1/26 | 126/21 A |
| 4,938,687 A * | 7/1990 | Monteil | F23D 14/065 | 126/39 R |
| 4,951,645 A | 8/1990 | Luebke et al. | | |
| 4,963,375 A * | 10/1990 | Sato | A21B 1/40 | 426/231 |
| 5,119,719 A * | 6/1992 | DePasquale | A21B 1/44 | 126/21 A |
| 5,197,375 A * | 3/1993 | Rosenbrock | A21B 1/40 | 219/388 |
| 5,205,274 A * | 4/1993 | Smith | A21B 1/245 | 126/21 A |
| 5,253,564 A * | 10/1993 | Rosenbrock | A21B 1/40 | 99/326 |
| 5,315,922 A * | 5/1994 | Keller | A47J 36/06 | 126/273 R |
| 5,378,872 A * | 1/1995 | Jovanovic | A21B 5/03 | 219/388 |
| 5,398,666 A * | 3/1995 | Smith | A21B 1/245 | 126/21 A |
| 5,413,033 A * | 5/1995 | Riccio | A21B 1/02 | 126/19 R |
| 5,492,055 A * | 2/1996 | Nevin | A21B 1/26 | 99/331 |
| 5,586,488 A | 12/1996 | Liu | | |
| 5,605,092 A | 2/1997 | Riccio | | |
| 5,872,351 A * | 2/1999 | Sowerby | A21B 1/02 | 219/621 |
| 6,037,569 A * | 3/2000 | Lincoln | A21B 1/44 | 126/21 A |
| 6,041,769 A * | 3/2000 | Llodra, Jr. | A47J 37/0759 | 126/197 |
| 6,053,094 A | 4/2000 | Cados | | |
| 6,125,740 A | 10/2000 | Hedrington et al. | | |
| 6,146,677 A | 11/2000 | Moreth | | |
| 6,250,210 B1 | 6/2001 | Moreth | | |
| 6,425,388 B1 | 7/2002 | Korinchock | | |
| 6,745,758 B1 * | 6/2004 | Minidis | A21B 1/02 | 126/277 |
| 7,323,663 B2 | 1/2008 | Cavada et al. | | |
| 7,619,186 B2 | 11/2009 | Cavada et al. | | |
| 7,686,010 B2 | 3/2010 | Gustavsen | | |
| 8,281,779 B2 | 10/2012 | Wiker et al. | | |
| 8,578,927 B2 | 11/2013 | Gustavsen | | |
| 2001/0051202 A1 * | 12/2001 | Hofer | A21B 1/40 | 426/523 |
| 2002/0017290 A1 | 2/2002 | Hines, Jr. | | |
| 2004/0035845 A1 * | 2/2004 | Moon | A47J 37/0623 | 219/400 |
| 2005/0173400 A1 | 8/2005 | Cavada et al. | | |
| 2005/0224064 A1 * | 10/2005 | Stockley | F24C 15/16 | 126/21 R |
| 2007/0108177 A1 * | 5/2007 | Engelhardt | A21B 1/44 | 219/388 |
| 2007/0204852 A1 * | 9/2007 | Cohen | A21B 1/02 | 126/273.5 |
| 2008/0156201 A1 * | 7/2008 | Cook | A21B 1/44 | 99/443 R |
| 2009/0020111 A1 * | 1/2009 | Immordino | A21B 1/52 | 126/9 R |
| 2009/0064985 A1 | 3/2009 | Gustavsen | | |
| 2010/0147281 A1 | 6/2010 | Gustavsen | | |
| 2012/0074122 A1 * | 3/2012 | Olver | F24C 15/005 | 219/392 |
| 2013/0167827 A1 * | 7/2013 | Marana | A21B 1/44 | 126/338 |
| 2013/0180978 A1 | 7/2013 | Elston, III et al. | | |

(56) References Cited

U.S. PATENT DOCUMENTS

| | | |
|---|---|---|
| 2014/0131345 A1 | 5/2014 | Watson et al. |
| 2014/0287119 A1* | 9/2014 | Dahle ............... F24C 15/16 |
| | | 426/520 |
| 2015/0184865 A1* | 7/2015 | Ricci ............... A21B 1/40 |
| | | 126/19 R |
| 2015/0245624 A1* | 9/2015 | Pinto ............... A21B 1/44 |
| | | 99/443 C |

* cited by examiner

PIZZA OVEN

CROSS-REFERENCE TO RELATED APPLICATIONS

This application claims priority of U.S. Provisional Patent Application Ser. No. 62/132,060, filed on 12 Mar. 2015; and U.S. Provisional Patent Application Ser. No. 62/197,968, filed on 28 Jul. 2015, both of which are incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a small, lightweight, portable, or easily movable pizza oven. The oven of the present invention preferably has a refractory dome, a rotating refractory floor. The present invention is preferably designed for baking small quantities of food, such as one pizza at a time, preferably at temperatures between 300° F. (149 C) and 1400° F. (760 C). The oven preferably has apparatuses, methods, and systems for independent temperature regulation of the floor of the oven and the dome of the oven. More particularly, the present invention relates to an oven preferably having equipment such as thermocouples, infrared temperature sensors, flame sensors, airflow sensors, position and movement sensors, fuel gas, carbon monoxide sensors, commercial programmable logic oven controllers, other computer processors, electronic devices, electronic ignition modules, general use programmable logic controllers and mechanical equipment including valves, burners, bearings, baffles, linear and rotary actuators and other mechanical equipment to independently control the temperature of the dome of the oven and the floor of the oven to simulate the operating conditions of a traditional high temperature Italian cupola masonry oven. The use of the oven preferably targets the production of gourmet Italian pizza but may be used for other foods and other industrial applications.

In preferred embodiments of the present invention, the floor of the oven generally rotates about a vertical axis. The dome of the oven may be fixed or moving, but preferably is fixed. The oven of the present invention is preferably adaptable for applications where portability is desired, such as catering with an oven on wheels, or mounted on food trucks. The oven is also preferably adaptable for small commercial operations where a larger oven would not physically fit because of space restrictions, or produce economically because of low baking volumes. Scaling to demand by adding additional ovens for larger commercial operations is also possible. An embodiment of the oven, with automated operating systems and safety controls is also adaptable for residential operation, where its small size suits conventional counter depths and physical space requirements for small appliance use in residential kitchens of conventional size.

2. General Background of the Invention

High temperature pizza ovens, of the Italian tradition, have changed little over the centuries. The simplest design uses two stones, parallel to each other, creating a space between where baking bread is positioned. Heat from a fire located below the bottom stone rises to the dome or top stone, causing it to hold heat energy. Radiant heat energy from the fire also heats the floor, or bottom stone. Bread or other food to be baked placed between the two stones is baked on the bottom by the heated floor the oven, and on the top by radiant heat energy from the dome of the oven. One side of the bread or other food, such as pizza, is closer to the fire and hotter than the other side of the food, which is closer to the access to the oven chamber, or the oven door. To bake the food evenly, the food must be rotated using a long pole during the baking cycle, so that the temperature at which the outside of the food bakes is averaged over time using physical rotation.

Luigi Morello of Genoa, Italy manufactures large industrial production cupola ovens today. The Morello oven has a rotating floor and two separate heating systems. The floor is heated by a burner under the floor with a dedicated temperature regulation system. The dome of the oven is heated by a second burner system and a second dedicated temperature regulation system. This oven requires a great deal of space having a large and heavy stone floor, in a 6000 pound (2722 kg) weight, and a thick deck that revolves, holding multiple pizzas at different stages of their bake cycles. It should be noted, that the edges of all pizzas, except the one located in the center of the large revolving floor, do not receive exactly even exposure to the door and the fire as they rotate. The rotating floor obviates the need to rotate the pizzas manually with a long handle peel. However, the individual pizzas may be tended just inside the oven door as they rotate past it, using a peel with a much shorter handle.

U.S. Pat. No. 4,305,329 to Fenoglio, (hereinafter "Fenoglio") has a gas heat source positioned under a heavy stone that rotates, holding multiple pizzas. Additionally, the toaster oven industry has produced multiple devices with rotating cooking surfaces and dedicated heat sources or electrical elements to independently heat the top and bottom of the food, however, none were particularly useful for baking pizza until U.S. Pat. No. 6,125,740 to Headrington, et al. (hereinafter "Headrington"). Marketed as "The Pizzaz", this oven is a countertop electrical appliance that uses a spinning pan to hold a single pizza and rotate it between an electrical element positioned above the surface of the pizza and an electrical element positioned below the rotating pan. The burner for the top of the pizza, and the burner for the bottom of the pizza are adjusted together by a single rheostat used to control the flow of electrical energy to both elements, operating in parallel. The device can achieve baking conditions similar to a low temperature electric residential oven operating in the high end of its operating range. It is not capable of producing the high temperature conditions required to bake Italian pizza.

U.S. Pat. Nos. 7,686,010 and 8,578,927 to Gustaysen (hereinafter "Gustaysen I" and "Gustaysen II", respectively), disclose small, lightweight, portable or easily movable pizza ovens with a rotating floor that can reach higher temperatures, known commercially as the "Two Stone Pro." However, this oven is limited in that it is heated by a single burner that burns propane, and temperature regulation in the Gustayson I oven is achieved by varying the gas supplied to the single burner by using a manually controlled needle valve, and by manually positioning a movable burner.

The Gustaysen II oven has two heat sources, both on the bottom of the oven structure. A first burner in the back of the oven that produces hot gas that flows directly to the dome of the oven, and a second burner under the hemispherical steel support structure for heating the oven floor. By varying the gas supplied to these two burners, the temperature of the floor and the temperature of the dome may be changed by adjusting gas flow with manual valves, one for each burner.

The Gustayson I and II ovens have limitations relating to their small heat sink mass relative to the mass of the cold pizza. Though the oven can be adjusted and tuned to a relative steady state when empty, that steady state is changed dramatically by placing a cold pizza in the baking chamber. The temperature of the dome and the temperature of the floor fall rapidly. Heat is transferred from the heat sinks above and below the pizza, cooling them during the bake cycle. When the pizza is removed from the baking chamber, at the end of the bake cycle, both the dome of the oven and the floor of the oven are significantly cooler than they were at the start of the bake cycle. Therefore, if reproducible baking conditions are desired, before the next pizza is placed in the baking chamber, the oven must remain empty for a period of time while heat is transferred from hot combustion gas to the refractory heat sinks at the dome and floor, making up for thermal losses to the uncooked pizza in the last cycle. In this way, the empty oven, with a stable heat supply allows the oven heat sinks to return to target temperatures. A relative steady-state condition occurs, where heat loss in the empty oven is matched by heat gain from a single fuel supply and burner position. After this "refresh cycle," and return to steady-state, the oven is ready for another pie to be baked at roughly the same bake cycle starting temperatures as the previous pizza. During the refresh cycle, the oven is not productive, reducing its commercial efficiency significantly.

Additionally, while a skilled operator may be able to manually measure and adjust baking temperatures, this requires time and skill. Therefore, there exists a need for a small, portable oven that automatically corrects for lost heat during the baking process and more efficiently return to necessary starting temperatures.

The following references are incorporated herein by reference: U.S. Pat. Nos. 4,305,329; 6,125,740; 7,686,010; 8,578,927; 3,095,186; 4,126,778; 4,437,396; 4,805,588; 4,951,645; 5,586,488; 5,605,092; 6,053,094; 6,146,677; 6,250,210; 6,425,388; 7,323,663; 7,619,186; 7,686,010; 8,281,779; U.S. Patent Application Publication Document Nos.: 2002/0017290; 2005/0173400; 2009/0064985; 2010/0147281; 2013/0180978; 2014/00131345; Foreign Patent Publication Nos.: FR 2,670,870; and BE 893,177.

BRIEF SUMMARY OF THE INVENTION

The proposed invention is a small, lightweight, portable, or easily movable oven. The oven of the present invention preferably has a refractory dome and a rotating refractory floor. It is preferably designed for baking small quantities of food, such as one pizza at a time, preferably at temperatures between 300° (149 C) and 1400° F. (760 C). The oven of the present invention preferably uses thermocouples and infrared sensors to sense and regulate, independently, the operating temperatures of the oven at the dome and on the floor during the bake cycle. Temperature measurement system data is preferably relayed to programmable oven controllers that preferably, based on a deviation of the measured operating temperature process value from an adjustable programmable temperature set point value, closes relays that power and open solenoid gas valves plumbed in the burner supply lines, increasing fuel flow to the dedicated burners for the floor and dome, thus increasing their temperatures and thermal energy storage. In this way, by measuring cool temperatures on the bottom of the oven, or at the dome, the oven "senses" system heat loss to the pizza during the baking cycle and compensates to target conditions by burning an increased volume of gas, bringing the oven back to temperature, independently, at the floor and on the dome.

Because substantial heat energy is added to the refractory heat sinks at dome of the oven and the floor of the oven, during the bake cycle, the "refresh process" is substantially complete before the pizza is removed from the oven at the end of the bake cycle. The oven is almost immediately ready to receive the next pizza at close to target temperature conditions. The time for the oven to refresh is greatly reduced, or eliminated, as the mechanism for holding the oven at target temperatures is automated for easy operation and reproducible baking cycles. Oven temperatures, on the bottom of the refractory floor, and at the refractory dome, are preferably displayed on an LED screen on the oven temperature controllers preferably with temperature set point values, and operating process values, so that an operator can verify operating temperature ranges without using a cumbersome handheld infrared sensor.

Because baking conditions are stable and reproducible because of electronic oven temperature regulation, a pizza dough with a specific hydration can be baked at a specific temperature set point value for the dome, and a specific temperature set value for the floor, so that the baking of the top of the pizza and the baking of the bottom of the pizza are complete exactly at the same time. The oven allows bake cycle times that are reproducible and stable, as well as a mechanism to rapidly and easily adjust and dome and floor temperature set point values and thereby manipulates the duration of the bake cycles within the limits of the device. Because the bake cycles are reproducible, an alarm can be used so that the operator does not need to tend the pizza during the vast majority of its bake cycle. When the bake cycle is almost complete, the operator's attention is diverted to supervising the precise moment that the pizza is removed from the oven for perfect results. This allows labor to be diverted to preparation of the next pizza, cutting the last pizza baked, and serving the pizza. These considerations are important in industrial applications like catering and commercial "micro-pizzeria" operation.

Though the present invention preferably uses simple "high and low" heating controls, proportional control systems would also work.

The oven of the present invention preferably uses a relatively low mass, thin refractory oven floor that is regulated to rapidly modify large fluctuations in the temperature of the bottom surface of a low mass oven floor and a low mass dome with relatively large burners, to complete the temperature adjustment of the heat sinks as they are compensated for thermal losses to cold pizza, preferably during the precise bake cycle of one individual pizza.

The present invention also includes a method of continuously baking pizza, bread or other food, the method comprising steps of:

(1) positioning the food, preferably a small portion, such as an individual pizza, in the center of the oven floor;

(2) rotating the oven floor throughout the baking time;

(3) removing the food from the oven;

(4) allowing the oven to return to its initial baking temperature; and (5) repeating steps (1) through (4) until all desired portions are cooked.

In this method, the food is preferably positioned at the oven door during its entire bake cycle, obviating the need to interrupt or modify the rotation of the oven floor to tend individual servings. The rotation of the food/pizza in the present invention is preferably done with the food/pizza at the center of the rotating floor so that every edge of the crust has equal exposure to the heat source and the oven door so that temperature fluctuations in the different parts of this thermal environment are averaged over the entire pizza surface area by rotating pizza over time.

The present invention preferably uses a thermocouple, and oven controller, and at least one dedicated burner to heat and change the temperature of the oven dome heat sink when it is cooled by thermal losses to cold pizza. Preferably, in a similar way, an infrared sensor is mounted at a distance beneath the oven chamber to directly measure the temperature of the underside of the refractory oven floor providing thermal data to an industrial oven controller. Preferably the oven controller operates the at least one dedicated burner that provides for flame and hot combustion gases to impinge preferably directly on the bottom of the refractory rotating floor. The remote location of the infrared sensor is novel; it is preferably under the oven chamber, and well beneath it. This position defends this electronic device from heat, in a structurally convenient location. In one preferred embodiment of this invention the infrared sensor "reads" the temperature of the bottom of the refractory material of the rotating oven floor preferably through a port in the bottom of the lower oven firebox, and through the open bottom and top of the novel cylindrical stainless steel oven floor support structure that is preferably joined to vertically oriented, radial steel plate supports, fixed centrally to a rotating axle.

In this embodiment, vertically oriented plate cylindrical perimeter of the rotating oven support structure is preferably stainless steel and provides for the creation of a chamber underneath the floor of the oven that preferably contains hot gas that it is preferably directed directly to the bottom surface of the rotating refractory oven floor, and around the outside edges and sides of the rotating refractory oven floor plate. This hot gas direction system is vastly different from the floor support structures of the prior art ovens, which are a closed space, heated indirectly by flames impinging indirectly on the outside surface of, for example, a hemispherical bowl that prevents direct contact of flame and hot gas with the refractory oven floor. This embodiment of the present invention allows for direct and constant sensing of the temperature of the bottom surface of the oven floor with a high accuracy infrared sensor, and a direct heating by flame and hot combustion gases of the bottom surface of the oven floor, as well as the edges and sides of the refractory oven floor plate, which creates a novel and rapidly responsive system to hold the oven as close as possible to an electronic temperature set point, as measured at the bottom of the rotating refractory oven floor.

Rapid modification of the temperature of the bottom surface of the oven floor plate causes temperature changes to occur rapidly through the mass of the relatively light and thin refractory oven floor plate, indirectly regulating the temperature at the top of this refractory oven floor plate where the pizza bakes.

The oven floor support structure is preferably open bottom, constructed in some embodiments with radial structural members that pass through the measurement field of the infrared sensor, during rotation. The infrared sensor is preferably set and calibrated to "ignore" the interference of the vertically oriented steel plate support members as they pass through the measurement field of the infrared sensor during floor plate rotation. This embodiment of the oven floor support structure is preferably open at the top and at the bottom, unlike the smaller ovens of the prior art.

Some embodiments of the current invention focus on contriving constant direct measurement of the bottom surface of the refractory oven floor plate and the rapid correction of an efficient deviation of the temperature of that surface from an adjustable electronic temperature set point, preferably in a ramp and soak hysteresis program set to limit valve switching during a single bake cycle. After initial bake cycle oven soak, or reduction in temperature, from the cold pizza, the oven is preferably set to end its ramp cycle, or period of increase in target temperature, at or before the time when the pizza is removed from the oven.

The result is an oven floor that compensates for thermal energy losses to cold pizza during an individual pizza bake cycle. Dome and floor regulation systems, preferably operating independently, allow the tops and bottoms of pizzas to be reproducibly baked in rapid sequence, very close to uniform average temperatures, that are easily and accurately adjustable at the dome and the floor of the oven, for specific different thermal conditions for the tops and the bottoms of different kinds of pizza. This device is more complex, more reliable, heavier, more efficient, more stable, more easily adjustable, more easily monitored, capable of higher productivity, capable of more easily reproducible baking conditions, all resulting in substantial savings in labor and burned pizzas in commercial operation.

Embodiments of the present invention may be used in any situation where a portable or easily moveable oven is desired, including as a portable commercial catering oven, a food truck oven, an indoor, easily movable, very small, commercial oven operating under a hood, and indoor high-end residential oven, conventional appliance size, countertop depth. This oven may also be designed with programmable logic controller, automated start and stop cycles, computerized safety shutdowns, redundant electronic controls, electronic ignition, safety gas main shut off, gas supply pressure sensing, airflow sensing, electronic flame verification, shaft rotation sensing, carbon monoxide and free gas fuel sensing, operating under a hood. Testing suggests that this oven would be capable of making gourmet pizza in less than two minutes, with a 10 minute firing time.

These ovens create four new markets. This is a sign of novel intellectual property. Specifically, the four new markets created are: catering oven, food truck oven, micro gourmet Italian pizzeria oven, and an automated high-temperature residential oven with safety controls. At the same time, this small production oven is scalable to large production processes including drive-through gourmet Italian pizza.

Small, electric ovens for residential and commercial use are known, and some have rotating decks. However, there is a need for independent regulation of the temperature at the dome and on the floor of an oven that is small, lightweight, easily movable, suitable for portable use, and designed to bake small and/or single portions, such as a single pizza. Even as they are, the power supply for these electric ovens is heavy-duty, limiting their convenience as a portable device because of the need for a large generator or a special power service. Because these ovens all struggle with power supplies, they generally have trouble maintaining target temperatures when baking pizzas in rapid sequence. Some prior art attempts to solve this problem by having doors that are closed during the baking cycle to contain heat. However, there is a need for an oven without doors that can maintain target temperatures through many bake cycles because, for example, in gourmet Italian pizza making, the end of the baking cycle must be observed by the pizzaiolio who must visually inspect the top and underside of the pizza to remove the pizza at precisely the right moment. Door operation is a complexity, in a process that lasts two minutes, and makes inconvenient work. The current invention is clearly different from the prior art in that it is able to maintain target temperatures from bake cycle to bake cycle without the need for an enclosed baking chamber.

The present invention addresses the limitations of the state of the art by disclosing a device that preferably uses equipment such as thermocouples, infrared sensors, other light array sensors, sound sensors, other methods of temperature sensing, commercial oven controllers, programmable logic controllers, electronic ignition and flame control modules, other computer processors, other electronic control devices, airflow sensors, motion sensors, position sensors, flame sensors, carbon monoxide and fuel gas sensors, and mechanical equipment, including manually adjustable gas valves, solenoid gas valves, proportional gas valves, bearings, fans, motors, belt drive systems, heat shield systems, baffles, rotary and linear actuators, baffles, gas burners systems, radiant electrical burner systems, infrared gas burner systems, forced air gas fuel systems, solid fuel burner systems, electrical induction heating systems and valves and other mechanical equipment to independently control the temperature of the dome and the floor of a small, lightweight, portable or easily movable pizza oven with a rotating floor preferably made of metal or refractory material, preferably designed to bake one pizza at a time. This small, lightweight, portable, or easily movable oven is designed to simulate the baking conditions of a traditional high temperature, high mass, fixed location Italian cupola masonry oven, designed to bake multiple pizzas at the same time. Some embodiments of this lightweight oven have automated start and stop cycles, redundant electronic controls, a gas main shut off valve, and other advanced safety features.

The use of the oven preferably targets the production of gourmet Italian pizza but may be used for other foods and other industrial applications. The oven is preferably designed to operate at high temperatures, ranging between 300 (149 C) and 1400 degrees Fahrenheit (760 C). In different embodiments of the present invention, the floor of the oven and the dome of the oven may be fixed or moving. The floor is preferably rotating and the dome is preferably fixed.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
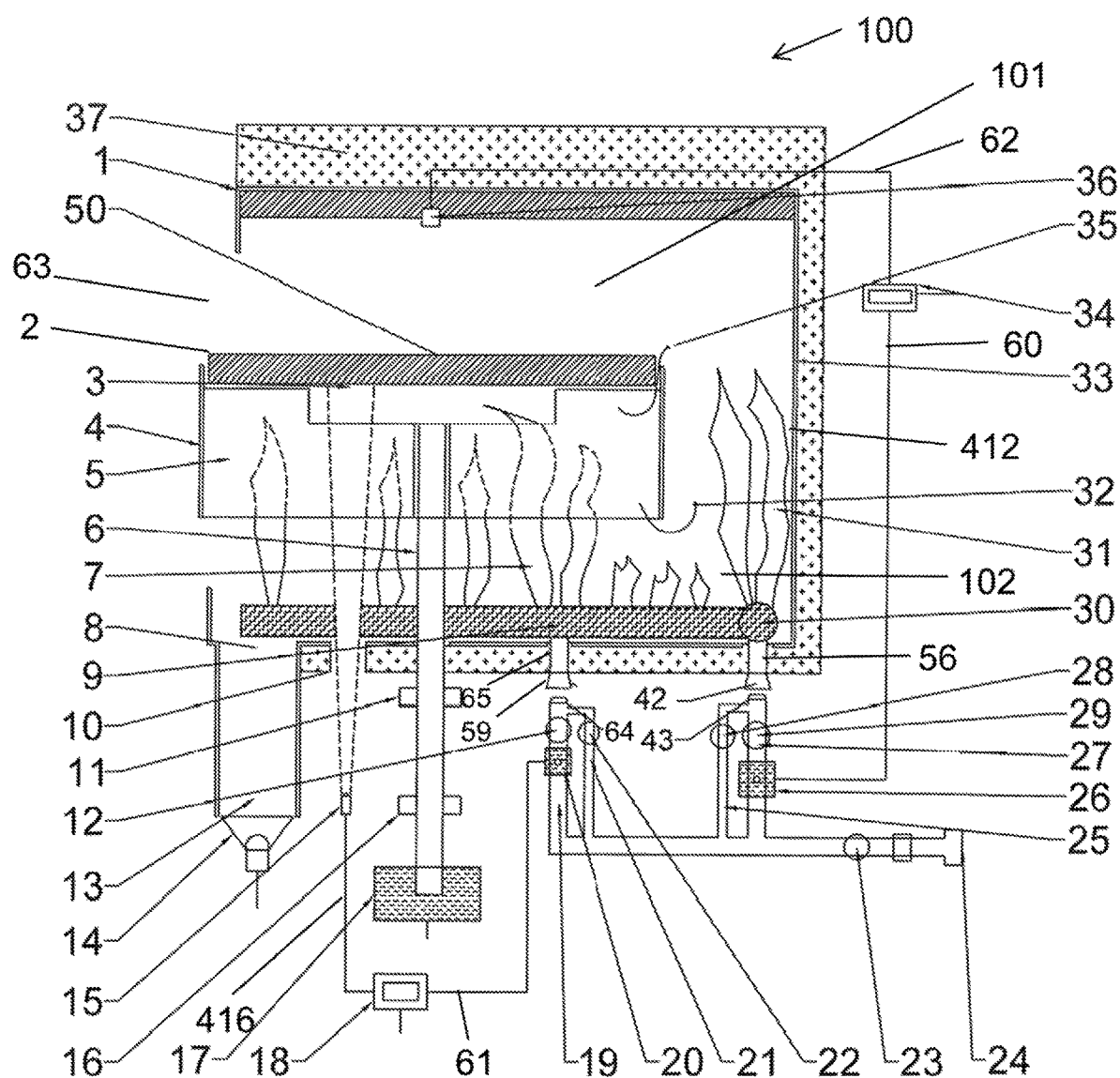
FIG. 1 is a cut-away view of a preferred embodiment of the solid axel oven of the present invention.

FIG. 1 is a two-dimensional cutaway schematic drawing of a preferred embodiment of the invention that uses a rotating solid axle to turn a carousel, or stainless steel underfloor support structure to support the refractory oven floor plate. We refer to this embodiment 100 as a "solid axle oven."

FIG. 1 is a side cutaway view of a preferred embodiment of a solid axle mechanism oven 100 particularly suitable for use in catering ovens 500 or food truck ovens 400. This solid axle oven 100 is shown with the front surface on the left hand side. Depicted is an oven entrance 63 with a rotating oven floor plate 2 that is preferably made of the refractory material. The floor plate 2 is preferably supported by a cylindrical carousel support structure 414 open at the top, and open at the bottom, preferably fabricated completely out of stainless steel. A cylindrical, vertically oriented, perimeter wall 4 is welded to at least three radial support members 5 that are attached centrally to a rotating solid axle 6. The top surface of the oven floor plate 2 serves as the baking surface 50 for the pizza. This design is rugged and easy to fabricate, but stainless steel will fatigue over long periods of operation causing eventual failure. This oven design would be preferred for catering and food truck operation where the oven is subject to repeated mechanical stress in movement. This oven is tough and inexpensive but eventually replacement of the stainless steel carousel 414 supporting the refractory oven floor 2, which is regularly subjected to temperatures above 700 degrees Fahrenheit (371 C), will likely be required.

An underfloor chamber 103 is formed by the underfloor support structure 414, open at the bottom and bounded at the top by the oven floor plate 2 and on the sides by the vertical stainless steel carousel perimeter walls 4 supported by the radial supports 5 connecting the axle 6 and the perimeter walls 4. This chamber 103 is important because it allows hot air in combustion gas 7 from underfloor burner 9 to accumulate underneath the oven floor plate 2 with the hottest gas 35 rising to the top of the chamber and escaping between the edge of the oven floor plate 2 and the vertical perimeter walls 4 ensuring complete heating of the entire oven floor plate surface including the edges. The coolest gas 32 flows out from underneath the lower edge of the vertical perimeter walls 4, rising to the dome 1 of the baking chamber 101 or out the front of the oven 63.

This oven preferably also uses two pipe burners 9, 30 welded together in perpendicular alignment, one burner 30 is positioned parallel to the back wall 412 of the oven for heating the dome 1, and another burner 9 extends forward under the rotating carousel 414 to heat the refractory oven floor 2. In this embodiment, because the burners 9, 30 are physically connected, the baking chamber 101 cannot achieve a condition where one burner 9, 30 is ignited and the other burner 9, 30 is supplying free gas to the oven chamber 101 from a burner 9, 30 that is not lit, creating conditions for a rapid sudden uncontrolled combustion of a large quantity of fuel gas mixed with air. Both burners 9, 30 will be on, or both burners 9, 30 will be off, unless there is no fuel supply to one of the two, because they are connected in a structural union that necessitates contemporaneous ignition.

Radial supports 5 between the rotating axle 6 and the perimeter walls 4 of the cylindrical carousel 414 oven floor support structure interfere with the measurement target 3 of the infrared sensor 15, requiring special calibration to adjust to the interference electronically allowing accurate measurement of the temperature on the bottom surface of the oven floor 2 rapidly and reliably. The infrared sensor 15 is located well beneath the fire box 102 requiring a port 10 so that sensing at the target 3 can be done from a structural position lower in the oven structure to prevent heat damage to the electronics.

The solid axle 6 is supported by an upper plate bearing 11 which is designed to have superior temperature tolerance compared to the lower plate bearing 16. The axle is turned by a drive mechanism 17 that can be an electrical motor with a gearbox and direct gear drive, or a gearbox 57 belt and pulley 44, or other drive mechanisms.

The baking chamber 101 is preferably illuminated by a light bulb 14 located beneath the baking chamber 101, preferably at the end of a hollow shaft 13 that penetrates the firebox floor 58 as a port 8, allowing light to radiate from a bulb 14 positioned in the cool environment beneath the firebox floor 58. Light radiates to the top of the baking chamber 101 to the dome 1 where diffraction causes illumination of the entire baking chamber 101. This is important because a glass lightbulb 14 is difficult to maintain and defend from temperature damage in the hot baking chamber 101. In this way, a novel solution is provided for the ancient problem of not being able to see the pizza positioned deep in the dark baking chamber heated by a solid fuel with little flame.

Temperature regulation of the dome 1 occurs by using a thermocouple 36 which conducts a signal by way of a thermocouple wire 62 to an oven controller 34, that is preferably programmable and industrial grade, and that switches a relay causing electrical current to flow through a control wire 60 and open a normally closed solenoid gas valve 26. A manual needle valve 29 is used to adjust the gas flow through the solenoid valve gas supply line 27 determining the amount of fuel used and hot combustion gas 31 flowing to the dome 1 when an increase in temperature is required. A dome solenoid gas valve bypass line 25 supplies fuel mixture to the dome burner gas jet 43 when the solenoid valve 26 is closed, providing a continuous gas supply for air fuel mixtures and flame a low burner setting. Gas flow through the bypass line 25 can be adjusted by a manual needle valve 28. Both gas lines supply a fixed position gas jet 43 that causes fuel to mix in a fixed position Venturi bell 42 conducting air fuel mixtures through a hollow pipe 56 between the Venturi bell 42 and the burner pipe 30.

Temperature regulation of the oven floor plate 2 occurs by using an infrared sensor 15 that connects by a control line 416 to an oven controller 18, that is preferably programmable and industrial grade, and that switches a relay that causes power to flow through a control line 61 and open a normally closed solenoid valve 20 that causes gas to flow through a solenoid valve gas supply line 19 and through a fuel gas jet 64 to cause air mixing at a fixed position Venturi bell 59 that is attached to a pipe 65 that conducts the air fuel mixture to the pipe burner 9 on which combustion occurs generating hot gas 7 that flows up to the underfloor chamber 103 and hot gas 35 to flow around the edges of the oven floor plate 2 and hot gas 32 to flow out from under the bottom edge of the vertical walls 4 of the stainless steel carousel out from underfloor support structure 414. A manual needle valve 12 is used to regulate the flow of gas through this solenoid gas valve line 19, adjusting the volume of air fuel mixture burned and converted the hot gas when an elevation of the oven floor plate is desired.

A manual needle valve 22 is used to regulate gas flow through the bypass gas supply line 21 for the underfloor burner solenoid gas valve 20. This needle valve 22 allows the setting of low flame for the underfloor burner 9 allowing oven tuning so that the oven floor plate loses temperature slowly when the solenoid gas valve is closed.

A manual needle valve 23 is also used to open and close the fuel supply common to both burners systems. Fuel gas supply from fixed piping or a portable propane tank is received by a fixture 24 that connects to a supply line.

The oven walls 33 are preferably fabricated out of sheet steel in highly portable ovens designed for catering and food trucks.

Preferably there is insulation 37 at the top and bottom and sides of the oven.

Figure 2:
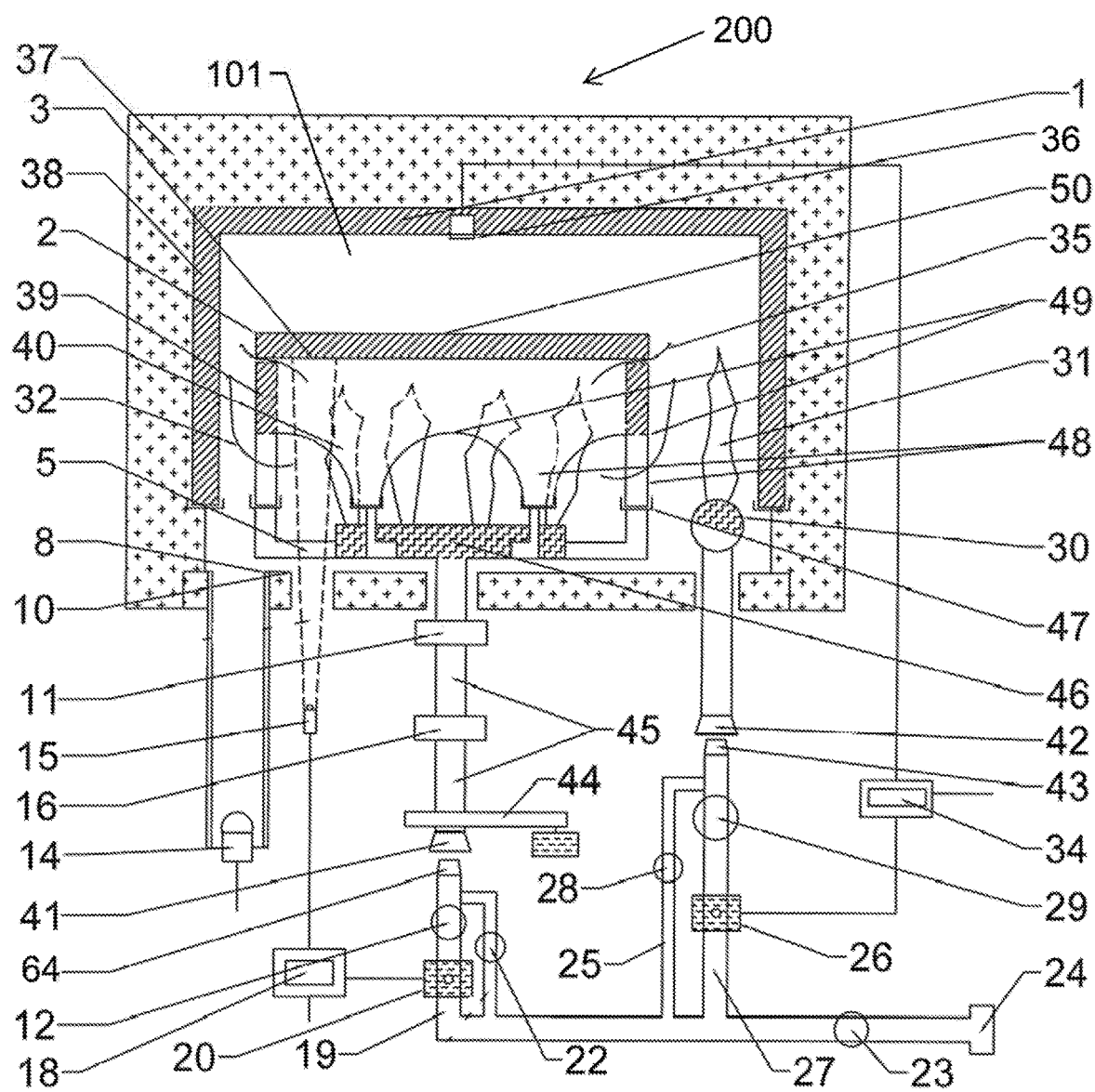
FIG. 2 is a cut-away view of a preferred embodiment of the hollow axel oven of the present invention.

FIG. 2 is a two-dimensional cutaway schematic drawing of a preferred embodiment of the invention that uses a hollow axle and a rotating Venturi bell to supply air fuel mixture to a circular burner that is welded to the axle and stainless steel radial support members. The steel radial support members receive refractory pillars that support the perimeter walls of the full refractory underfloor chamber bounded at the top by the refractory floor plate. We refer to this embodiment as a "hollow axle oven" 200.

FIG. 2 is a front cutaway view of a preferred embodiment of the invention that uses a hollow axle 45 that rotates, attached at the lower end to a rotating Venturi bell 41 that receives fuel from a fixed position gas jet 64 that is held by separate structure in a position just underneath the rotating Venturi bell 41 to receive gas fuel from the jet 64 for mixing with air inside of the Venturi bell 41. An air fuel gas mixture is conducted through the lumen of the hollow axle 45 to the upper end of the hollow axle 45 where it is connected directly to the burner 46. The burner 46 is preferably circular when viewed from the top, or rectangular when viewed from the front cutaway. The burner is 46 welded to the top end of the vertically oriented axle 45 as well as the radial vertical plate stainless steel supports 5 that support welded at one end to the burner itself and to the other end to metal channels 47. These metal channels 47 receive the bottom ends of refractory pillars 48 supporting vertical full refractory underfloor structure perimeter walls 39. We refer to this oven as the "hollow axle oven" 200.

The rotating Venturi bell 41 may also be located higher in the structure, under the bottom oven skin or cabinet 502 and above the upper plate bearing 11 if it is supported by a rotating hollow axle 45 supported and aligned by an upper plate bearing 11 and lower plate bearing 16, containing a fixed steel tube to provide gas supply and structural support to a fixed fuel jet 64 positioned just under the orifice of the rotating Venturi bell 41 supported by the structure of the rotating hollow axle 45 containing the gas jet supply and support tube. Bearing to align the gas jet tube can be attached between the fixed tube and the rotating axle around it.

Hollow axle ovens 200 have a rotating burner 46 is preferably supplied with an air/fuel/gas mixture through a hollow axle 45 attached to the bottom of the burner 46 so that the air fuel mixture can be conducted to the burner 46 for combustion. This burner produces moving flames 40.

The coolest of the hot combustion gas 32 in the underfloor chamber 103 flows underneath the lowest edge 49 of the refractory perimeter walls 39 of the underfloor chamber 103, and between the refractory pillars 48 supporting the refractory perimeter walls 39. The hottest of the combustion gas 35 in the underfloor chamber 103 circulates from under the bottom outside edge of the oven floor plate 2 and above the highest edge of the vertical underfloor chamber perimeter walls 39 that support the oven floor plate 2.

Figure 8:
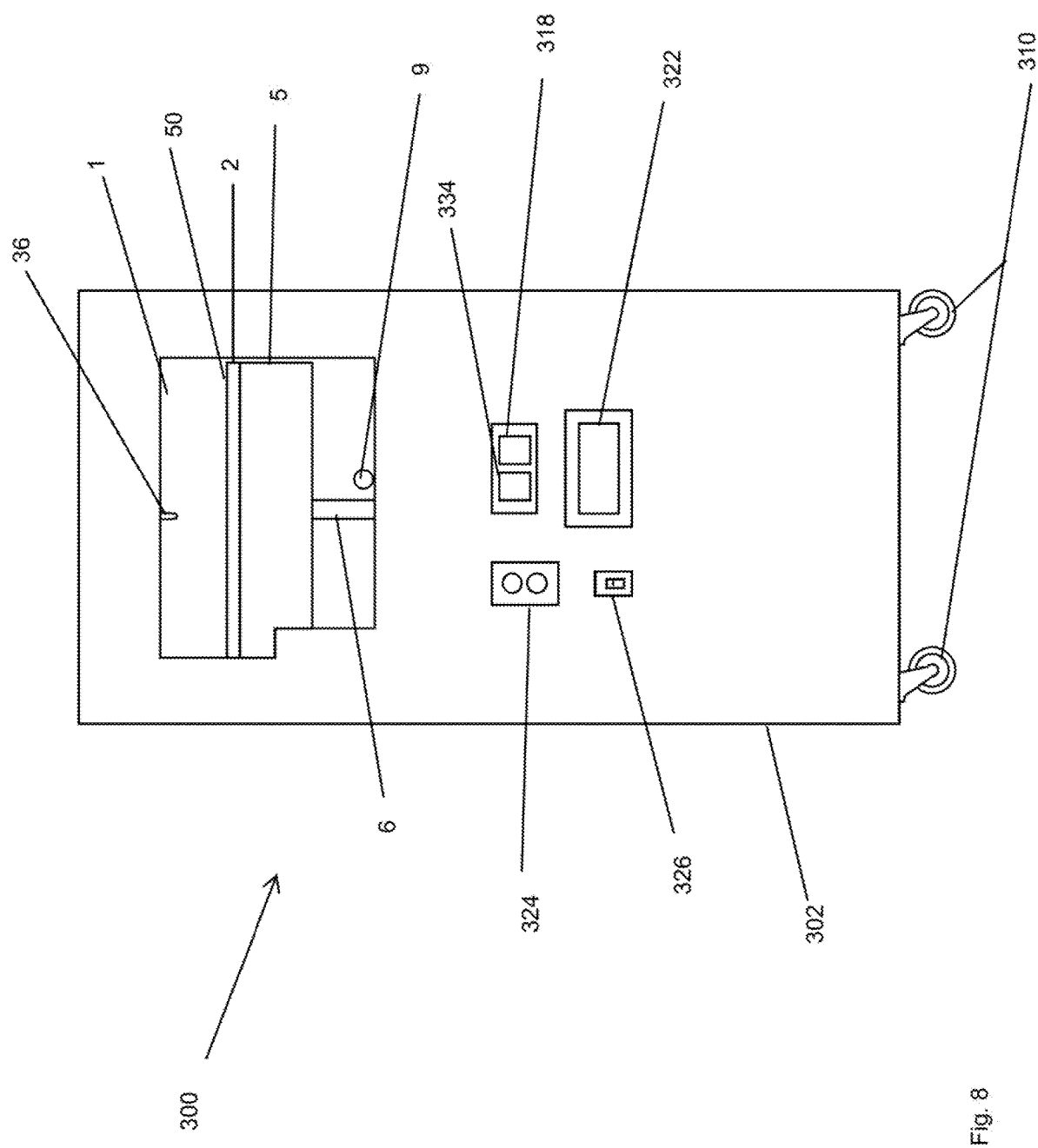
FIG. 8 is a front view of a preferred embodiment of the residential oven of the present invention.

The hollow axle 45 preferably passes through two bearings 11, 16 for alignment and support. The novel design preferably incorporates a moving Venturi bell 41 or housing fixed to the bottom end of the hollow axle shaft 45 as it rotates. The gas jet 64 that injects gas fuel into the Venturi bell 41 and the hollow axle 45 attached to the burner 46 above, preferably remains fixed. In this way, the burner 46, the refractory pillars 48, the refractory vertical underfloor chamber perimeter walls 39, the oven floor plate 2, the radial steel plate supports 5, the hollow axle 45, and Venturi bell 41 all rotate, over a gas jet 64 fixed under the base of this rotating structure. Steel members are preferably not used above the level of the burner 46, where high temperatures develop underneath the oven floor refractory plate 2. Instead, the walls 39 of the cylindrical oven floor support structure are preferably made of refractory material, creating a full refractory cylindrical underfloor chamber supported by refractory members, supported at their base by vertically oriented plate steel radial supports 5 attached to the burner 46 joined to the rotating hollow axle 45. This design prevents steel elements from being exposed to high temperatures. This adds both weight, and heat sink capacity, to the underfloor oven structure, making it less desirable for portable operations with mechanical stress caused by moving the oven, and more desirable for fixed applications, like "micro-pizzeria" operations or residential use. This oven 200 would preferably be mounted on casters 310 as shown in FIG. 8.

This "hollow axle oven" 200 preferably has a full refractory dome 1 and full refractory oven walls 38 in this way, all structural elements. This improves the longevity of the oven walls 33, 38 and underfloor support structure pillars 48 and perimeter walls 39, and increases the mass and stability of the heat sinks, improving the efficiency of the oven as a whole. The baking chamber 101 is enclosed by refractory material on five sides.

Figure 3:
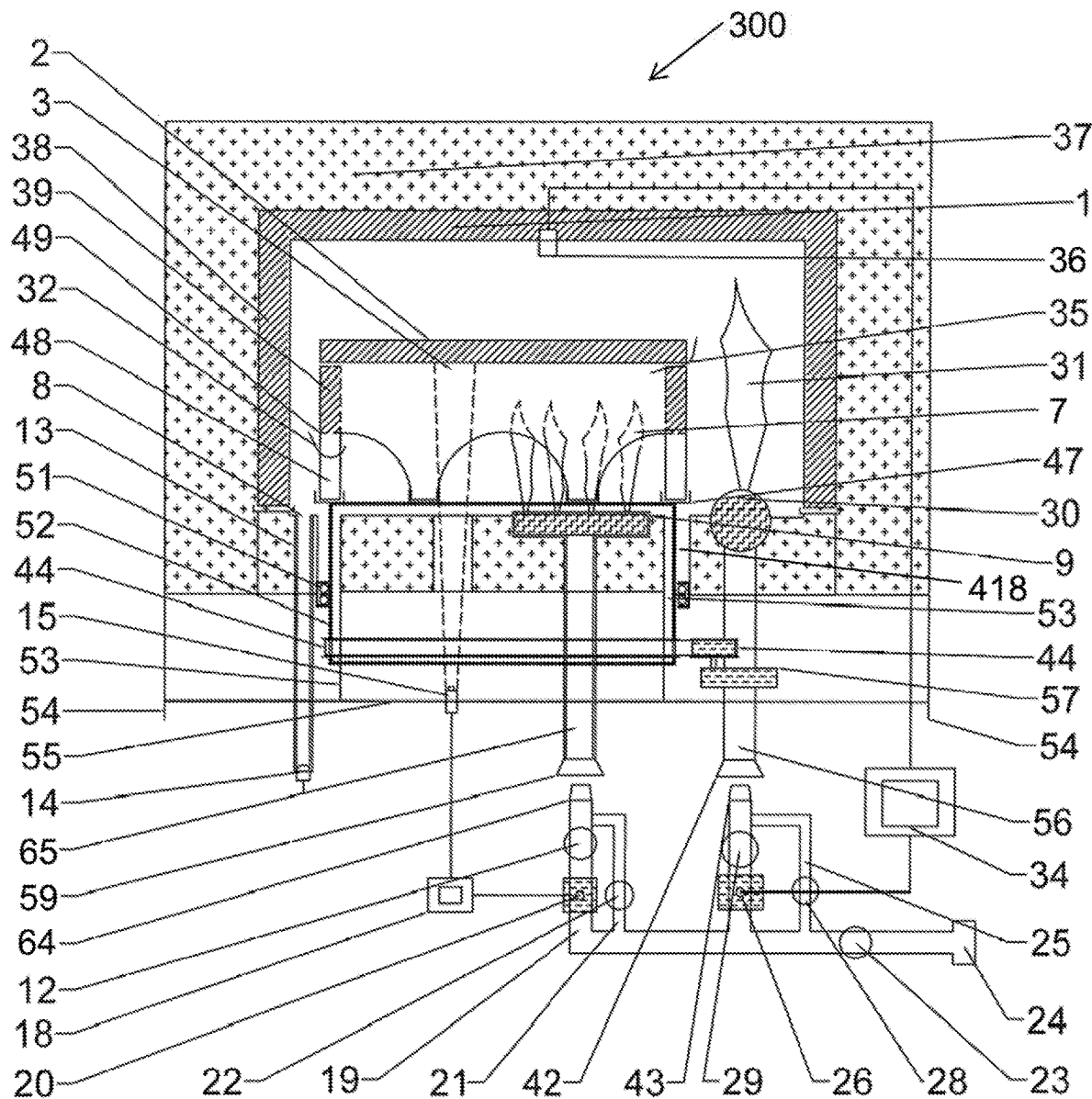
FIG. 3 is a cut-away view of a preferred embodiment of the rotating drum oven of the present invention.

FIG. 3 is a two-dimensional cutaway schematic drawing of a preferred embodiment of the invention that uses a rotating stainless steel drum supported by track bearings to support refractory pillars and the perimeter walls of a full refractory underfloor support chamber. The rotating drum revolves around a central fixed position pedestal that contains the burner and the infrared sensor shaft. We refer to this embodiment as a "drum oven" 300.

FIG. 3 is a front cutaway view of a preferred embodiment of the oven present invention that is equipped with a full refractory cylindrical under floor support structure comprised of the oven floor plate 2, the vertical refractory perimeter oven walls 38, and refractory pillars 48, supported at its base preferably by the vertical walls of a rotating steel cylindrical drum 52. Instead of being supported by vertically oriented steel plate radial support members fixed to an axle, as in the previous described embodiments (100, 200), this oven preferably uses track bearings 51 to hold a hollow cylindrical steel drum 52 in alignment the track bearing 51 assembly is fixed to the steel drum 52 along its lower perimeter or circumference. This hollow steel drum 51 preferably revolves around a cylindrical pedestal 53 that contains the burner 9 and the infrared sensor 15 mounted in fixed positions with surrounding insulation 37, held in alignment at a fixed base 54. The pedestal 53, preferably fills the inside of cylindrical steel carousel underfloor support structure or drum 52, preferably containing insulation material 37, infrared sensor port 10, and burner assembly for underfloor burner 46. The track bearings 51 are also held in alignment by the fixed base 54. The track bearings 51 articulate with a track 418, mounted on the outer perimeter of the cylindrical steel drum 52 in its lower portion. In this way, the drum 52 rotates, supported by the track 418 along its perimeter. Other track bearing configurations are possible. We refer to this design mechanism as a "drum oven" 300.

The hollow rotating cylindrical drum 52 revolves around the vertical walls of a fixed cylindrical center pedestal 53 supported by a horizontal plate 55, connecting with a fixed base support 54. This oven design allows the infrared sensor 15 to read the target field 3 at the bottom of the revolving oven floor plate 2 without interference from rotating radial support members passing through the infrared sensor sampling field 3, as seen in other embodiments (100, 200). This is because the underfloor burner assembly 9 and infrared sensor shaft and port 10 are located in the space formed by the vertical steel walls of the center pedestal 53. Flame and hot gas 7 produced by the burner 9 impinge directly on the bottom surface of the oven floor refractory plate 2, without heating radial support members and causing their thermal fatigue. The floor 2 of the oven and the underfloor chamber walls 39 may be constructed of refractory material so that the underfloor chamber 103 is a full refractory dome.

This oven 300 is best suited for fixed location use, small commercial pizzeria or residential use. It has a full refractory dome 1, refractory oven walls 38, refractory oven floor plate 2, refractory vertical perimeter underfloor chamber walls 39, and ceramic pillars 48 to support these walls 39. These are all the structural members subjected to high temperature and they are preferably all made of refractory material. Steel structures, including the metal channels 47 that receive the refractory pillars 48, the steel drum 52, the burner 9, the firebox floor 58, do not extend above the height of the burner, and are maintained in a cool environment relative to structural elements that comprise the boundaries of the baking chamber 101.

Figure 4:
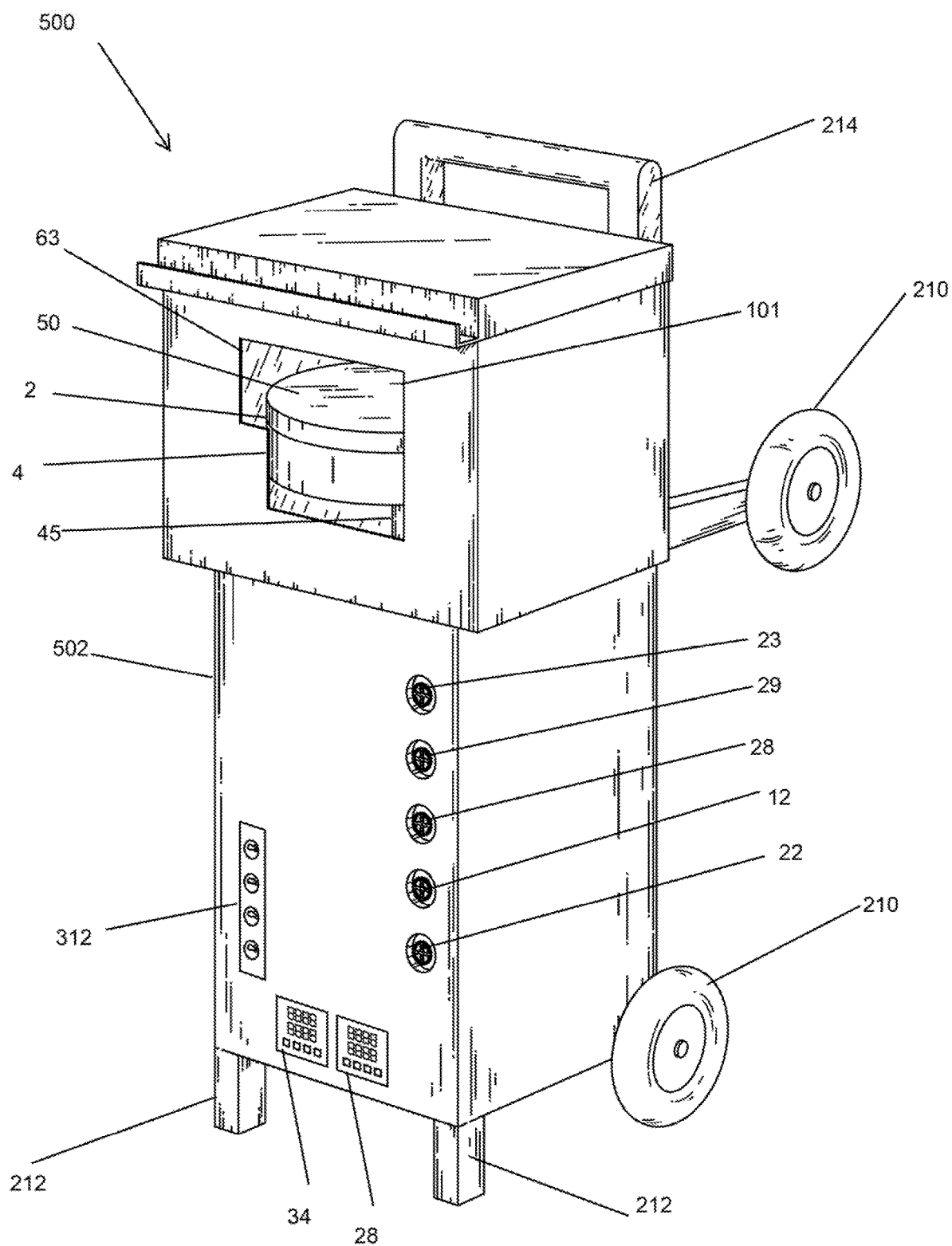
FIG. 4 is a perspective view of a preferred embodiment of the catering oven of the present invention.

FIG. 4 shows a preferred embodiment of the catering oven 500 of the present invention. It is preferably a solid axle oven 100 with wheels 210, foot pegs 212 and a handle 214 making this embodiment ideal for catering.

FIG. 4 is a perspective view of a preferred embodiment of the catering oven 500 of the present invention. The cabinet and structure have been modified to adapt it to the needs of catering.

It has been modified with a handle 214, wheels 210, and foot pegs 212 so that it can be tilted backward and rolled through doorways and up ramps or stairs and even onto power lifts so that it can be loaded into a light service van. This oven 500 is designed to cater pizza outdoors in remote locations, or other catering venues where a full kitchen may not be available, operating on power from a standard car battery and a standard small barbecue grill propane tank (not shown). Electrical switches 312 are shown in the lower left-hand corner for general power, lighting, valve and controller operation, and motor operation.

Figure 5:
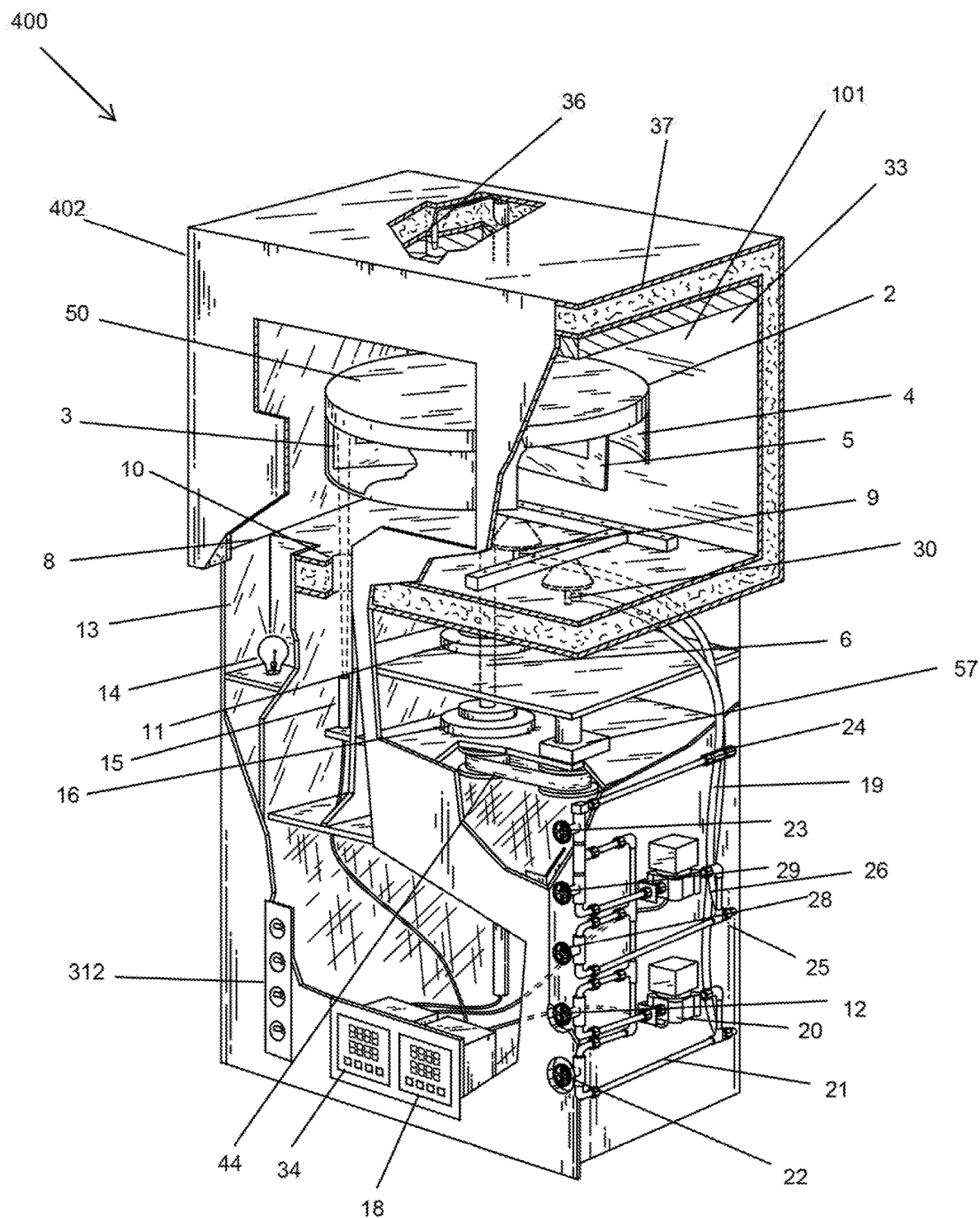
FIG. 5 is a perspective cut-away view of a preferred embodiment of the food truck oven of the present invention.

FIG. 5 is a perspective cutaway view of a preferred embodiment of a solid axle oven 100, with a cabinet suitable for mounting in a counter cut out or brackets for food trucks. This oven requires rear access for maintenance.

FIG. 5 is drawn to show the physical details of a preferred embodiment of a solid axle food truck oven 400. The oven shown would preferably be mounted on a bracket or be received by a cut out in a countertop. It would be suitable for food truck operation with access from the rear for repair. This oven would generally be suspended off of the floor for easy cleaning underneath. It would be operated from the front. Electrical switches 312 for supply of power to the oven 400, the drive mechanism 17, which includes gear motor 57 and drive belt 44, the controllers 18, 34 and solenoids 20, 26, and the light 14 are positioned in the left lower corner.

Figure 6:
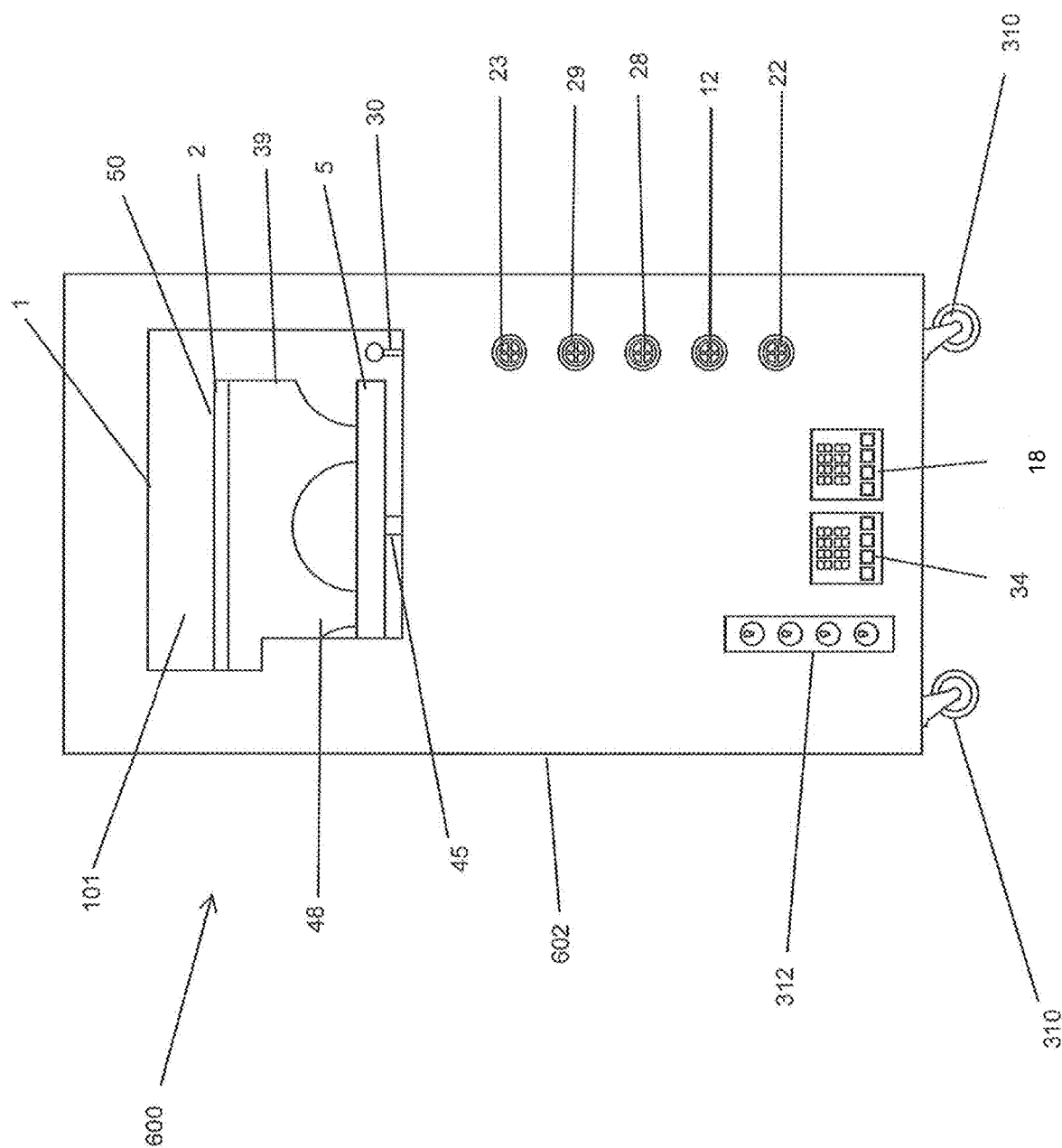
FIG. 6 is a front view of a preferred embodiment of the fixed location hollow axle oven of the present invention.

FIG. 6 is a front view of the exterior of a preferred embodiment of a hollow axle oven with a lower cabinet 602 on casters 310. This design is preferable for a fixed location commercial or residential oven 600. The fixed location oven 600 is preferably fitted with casters 310 as shown in FIG. 6, so it can be pulled away from the wall to be maintained from the rear.

Figure 7:
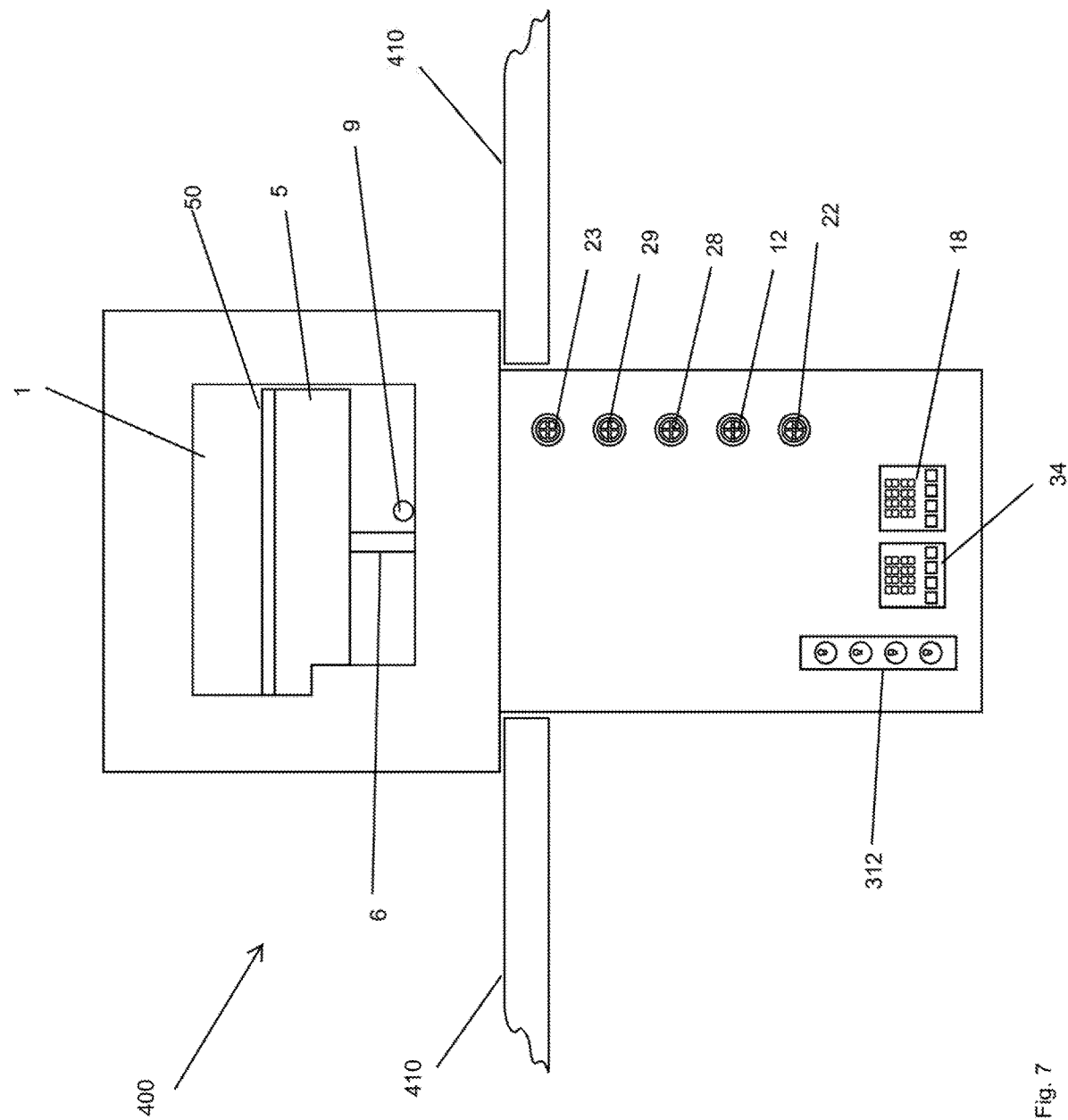
FIG. 7 is a front view of a preferred embodiment of the food truck oven of the present invention.

FIG. 7 is a front view of a preferred embodiment of a solid axle food truck oven 400 of the present invention. This embodiment 400 is preferably operated from the front, maintained from the rear, and mounted in a countertop 410, as shown in FIG. 7.

FIG. 8 is a front view of a preferred embodiment of a solid axle residential oven 300 of the present invention, with a programmable logic controller 322 for automated start stop cycles. This embodiment of the oven 300 preferably has a solid axle oven fitted with a boxlike stainless steel exterior 302, a programmable logic controller 322 for automatic start stop cycles, and advanced safety features, such as gas sensors, flame sensing, automated electronic ignition with forced air ventilation, and redundant thermal controls with main gas valve shut off (not shown, inside cabinet). The oven 300 has dedicated start and stop buttons 324, and a dedicated light switch 326.

Individual controllers 34, 18 are used for the regulation of the temperature of the dome 1 and the floor 2. The oven 300 is preferably fitted with casters 310 so that it can be accessed in the rear for repair.

Figure 9:
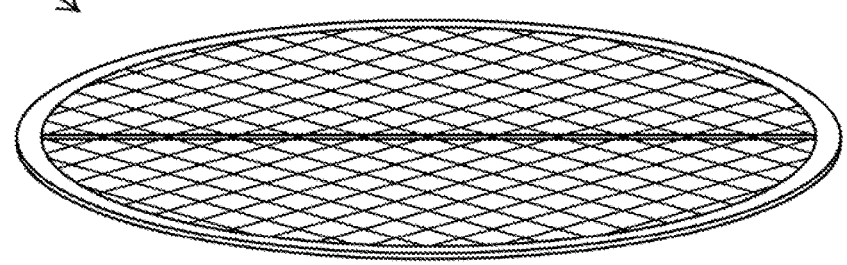
FIGS. 9-11 show preferred embodiments of oven screens of a preferred embodiment of the present invention.
Figure 10:
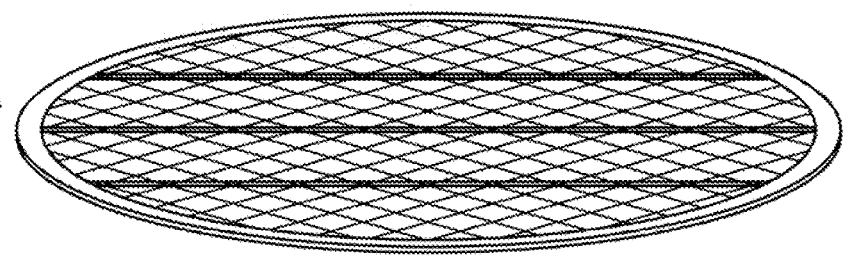
Figure 11:
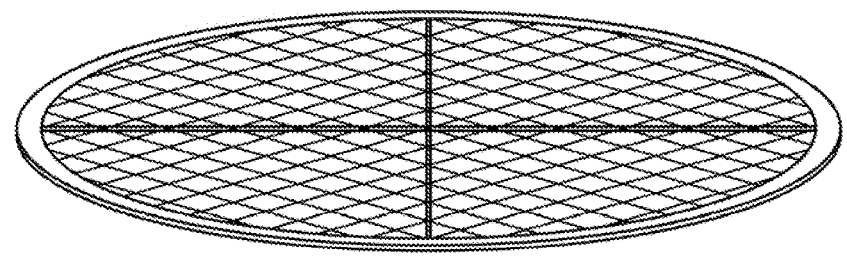

FIGS. 9-11 show preferred embodiments of oven screens 900 of the present invention with various designs for wire support structures.

FIG. 9 shows a pizza screen 900 supported by a single wire rod that crosses under the mesh in the middle of the circular metal rim of pizza screen. FIG. 10 shows a pizza screen 900 with a bent metal edge perimeter. Three wire rods are arranged in parallel across the area of the screen 900, holding the wire mesh off of the baking surface 50.

FIG. 11 shows a pizza screen 900 with a bent metal peripheral edge, containing metal screen or mesh, suspended off the baking surface 50 by two wire rods that are arranged front to back and side to side so that they intersect at perpendicular angles under the mesh.

Figure 12:
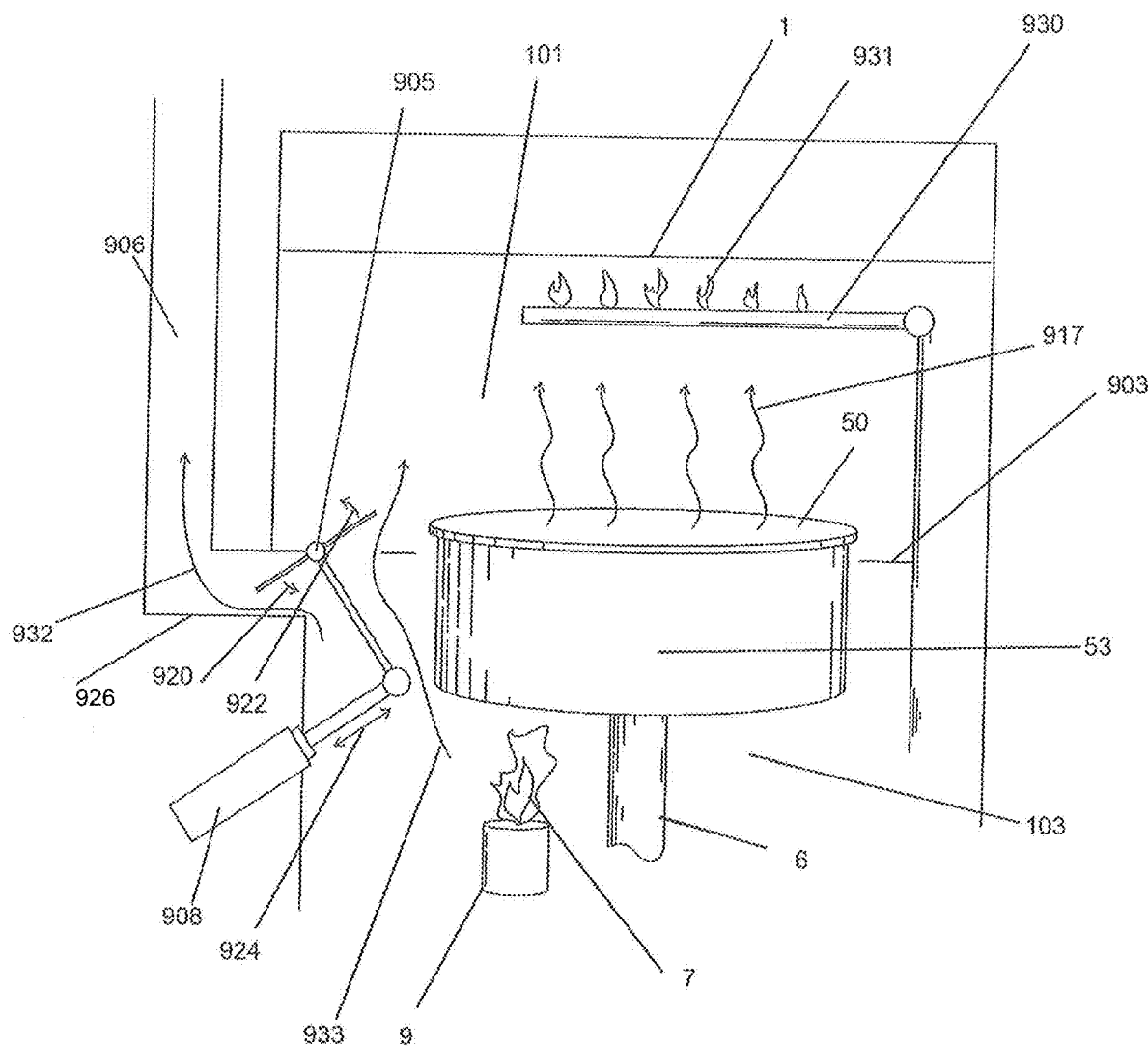
FIG. 12 is a cut-away view of an alternate embodiment of the solid axel oven of the present invention.

FIG. 12 is a front view schematic diagram of an oven that uses a actuator 908 to operate a baffle 905 to divert hot combustion gas from the underfloor chamber inside the underfloor support structure 414 to the dome 1 of the oven or the oven baking chamber 101 or to a side port 926 and flue 906 to conduct hot combustion gas (shown by arrow 932) to the external environment. Alternatively, hot gas (shown by arrow 933) may be ported to the dome 1. This mechanism allows greater separation between the hotter oven floor plate 2 temperature and the temperature in the baking chamber 101 in an inverted oven 901. The actuator 908 is automated so that it opens and closes the baffle 905, as illustrated by directional arrows 920, 922, depending on the thermal conditions at the dome 1 or oven floor 2, FIG. 12 is a front view schematic cutaway of a solid axle oven with a barrier plate 903 at the bottom of the baking chamber 101 restricting hot gas, shown by arrows 932, 933, from the underfloor chamber 103 produced by the underfloor burner 9 from flowing unobstructed into the baking chamber 101. A baffle 905 can be used to divert gas selectively to the baking chamber 101 or a separate port 926 and flue 906 for independent ventilation of the underfloor chamber 103 and the hot gas produced by the underfloor burner 9, This drawing shows the dome burner 930 located in the baking chamber 101, closer to the dome 1 than in other embodiments. The actuator 908 can be automated so that the baffle 905 can be open when the dome 1 is cool and closed when the dome is at set point temperature, as shown by, directional arrows 920, 922.

In this embodiment of the oven 901 with a baffle 905 operated by an actuator 908 as shown in FIG. 12, automation is used to change the position of the baffle 905 to divert hot gas either to the dome of the oven one and the baking chamber 101 or to a side port 926 and flue 906 (shown by directional arrows 930, 932), allowing separate or combined ventilation for the underfloor chamber 103 inside the oven floor support structure 414, and the dome 1 of the oven 901 and the baking chamber 101. This allows a mechanism for greater separation in the temperatures of the hotter oven floor plate 2 and the oven baking chamber 101 and dome 1.

Figure 13:
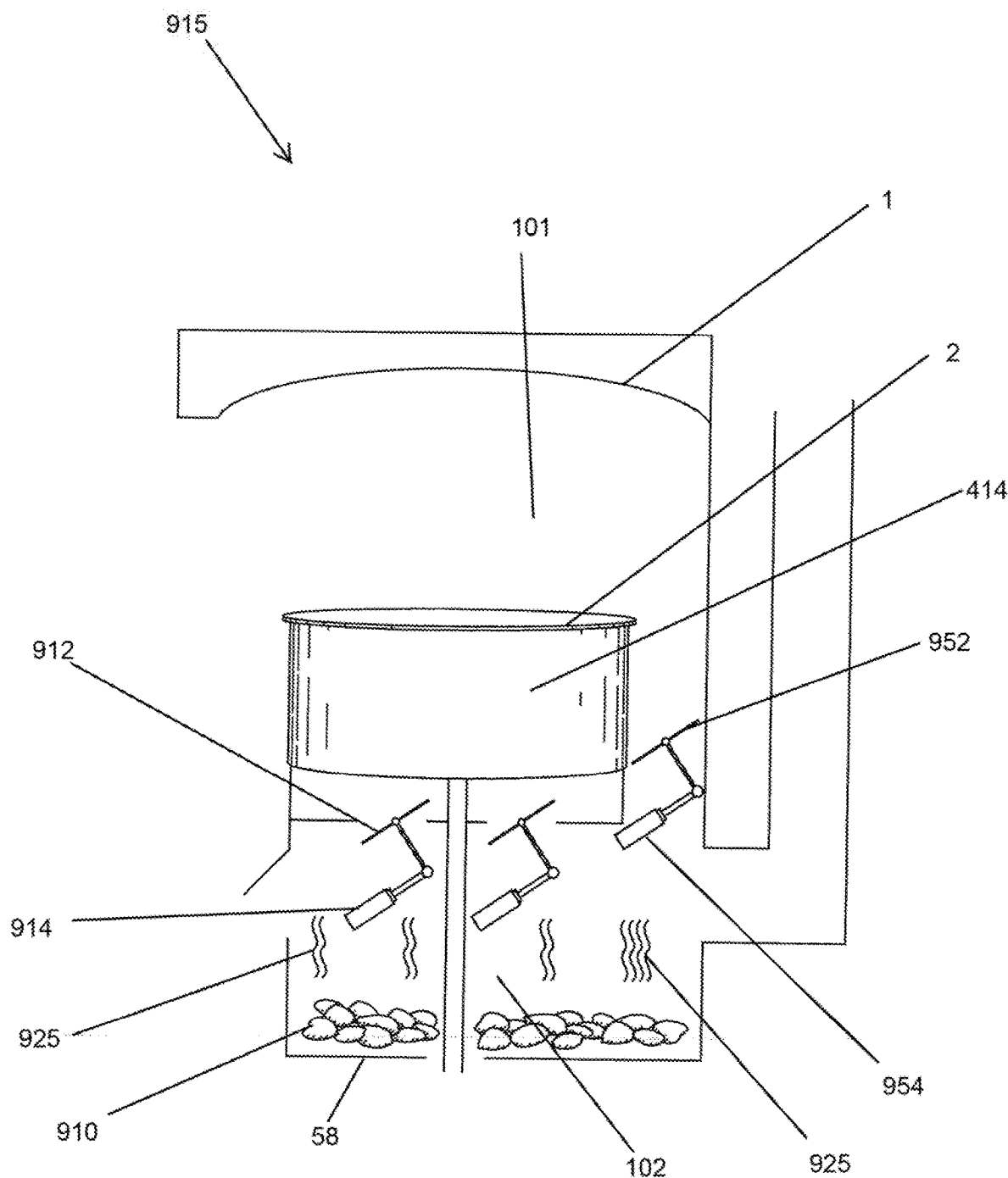
FIG. 13 is a cut-away view of a preferred embodiment of a solid fuel oven of the present invention; and, FIG. 14 shows the oven floor plate and support structure of a preferred embodiment of the oven of the present invention.

FIG. 13 is a solid fuel oven 915 variation of the oven of the present invention that uses solid fuel 910 to heat the under floor chamber 103 inside the underfloor support structure 414 using baffles 912 operated by actuators 914 physically positioned outside of the firebox 102. Separate actuators 954 operate baffles 952 to heat the baking chamber 101 and the dome 1 and the underfloor chamber 103 and the oven floor plate 2.

FIG. 13 shows a schematic of a solid fuel oven 915. Solid fuel 910 inside a firebox 102 produces hot gas (shown by lines 925) that is vented by baffles 912 operated by actuators 914 to provide hot gas to the underfloor chamber 103 inside the underfloor support structure 414 and to the dome 1 and the baking chamber 101. By opening and closing different baffles 912, 952, the underfloor chamber 103 and oven plate 2 as well as dome 1 and baking chamber 101 can be preferentially heated. Actuators 914, 954 would be preferentially controlled by industrial oven controllers 18, 34 (not shown) to open and close the baffles 912, 952 to maintain target temperatures.

Figure 14:
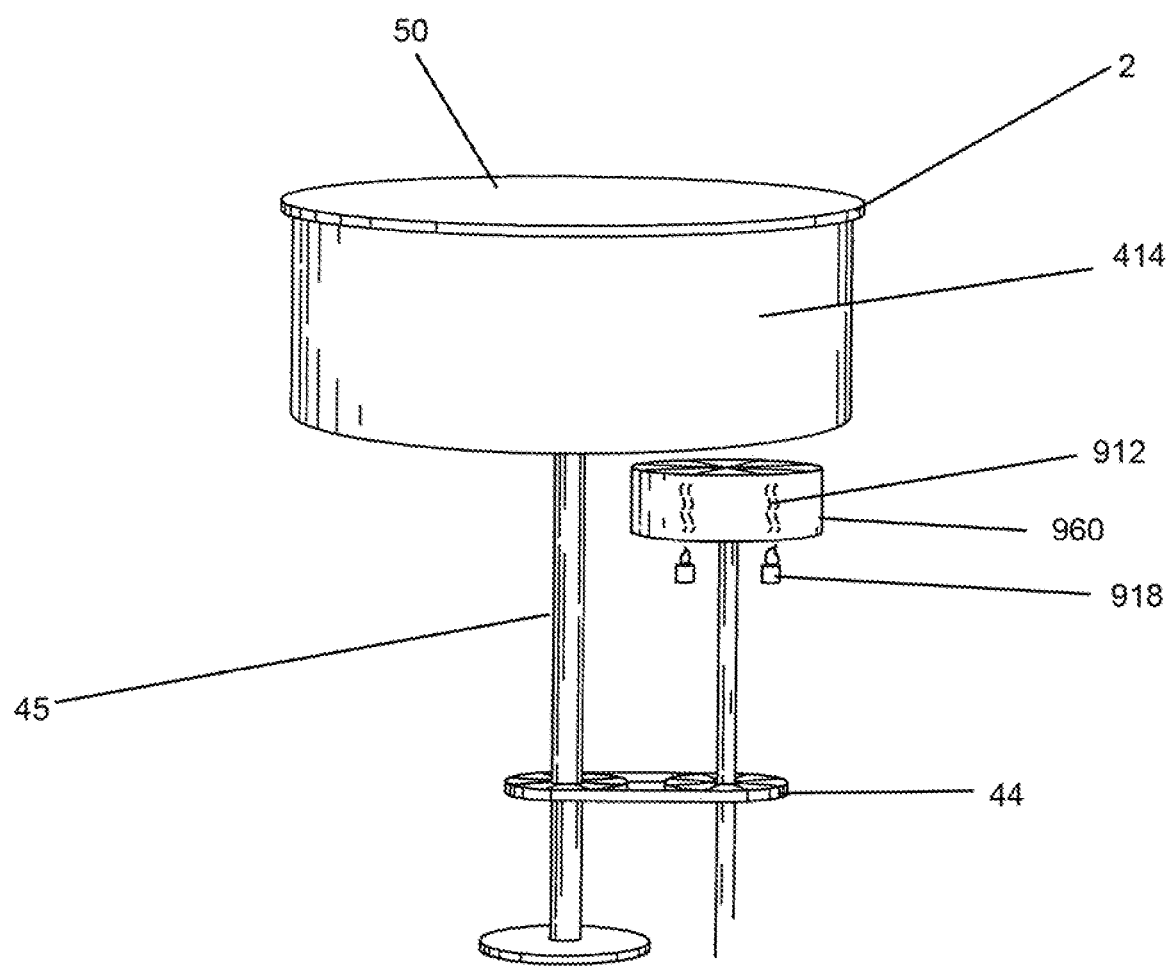

FIG. 14 is a front view perspective drawing of an oven floor plate 2 and underfloor support structure 414 supported on a solid axle 6 driven by a belt and pulley 44 on the 2nd shaft that is turned by a gas jet propelled turbine. The same hot gas that drives the turbine heats the underfloor chamber 103 inside the oven floor support structure 414 and the oven floor plate 2.

FIG. 14 is a front view schematic drawing of an oven floor plate 2 being supported by an underfloor chamber 414 on an axle 6, 45 that is being driven by a belt drive 414 propelled by a gas turbine 960 driven by jets 918 that also cause hot gas to heat the underfloor chamber 103 inside of the underfloor support structure 414 and the oven floor plate 2.

A hollow axle oven 200 is generally constructed with a dome 1 at the top of a baking chamber 101 preferably made of refractory material, but other heatsink materials may be used, including metals and metals mixed with refractory materials such as may be used for heating by induction systems. Electrical elements may also be used on the dome 1 to heat the top surface of the pizza, using a heatsink mechanism or varied electrical current to control the thermal conditions at the dome 1 of the oven and regulate its temperature during the baking cycle. Infrared sensing systems may also be used to regulate dome temperature with controllers and fuel valves to vary fuel supply for temperature regulation. The thickness of the dome or top oven lining may be up to 4 inches (10.16 cm) in thickness or height. The dome 1 structure may be fixed or moving and may be heated from above or from below. The dome structure 1 is generally supported by the oven walls 33 which are in turn supported by support structures such as oven floor support 414, plate 55, or cabinet 302, 402, 502, 602. These may be metal frames made of sheet or tubular elements that are contiguous with the dome structure. In an alternate embodiment, the dome 1 may be suspended in space above the oven floor in an oven without walls. The dome 1 may be suspended in space, held in position by separate structure, above the oven floor, in an oven without walls.

An opening in the front of the baking chamber or oven door 63 provides access to the baking chamber 101, which is large enough to accommodate a pizza, or a pizza on a pizza screen 900, or another food item to be baked in the oven, being moved into and out of the oven. In general, the door 63 to the baking chamber 101 is open during the entire bake cycle, but a physical moving door structure (not shown) may be provided so that the baking chamber 101 may be closed to protect it from rain or other environmental hazards. The door structure may be solid or include high temperature glass elements.

Ventilation of hot combustion gas and drafting to a flue may occur through the oven door 63, or through a separate vent Snot shown) in the dome 1 of the oven or the walls 33, 38 of the oven. For example, in FIGS. 1, 2, and 12, hot gas shown by arrow 32, 932 escaping from underfloor chamber 103, produced by the underfloor burner 9, can vent directly to the dome 1 of the oven and co-mingle with exhaust gases 31, 931 from the dome burner 30, 930, ventilating together through the oven door 63, or through vents and flues in the dome 1, or the walls 33, 38 of the oven (see e.g. FIGS. 12-13, reference number 906). Alternatively, as shown in FIG. 12, a horizontal plate barrier 903 can be welded to the walls at the bottom of the baking chamber 101 fixed around the perimeter of the rotating oven floor plate 2 preventing hot combustion gases from escaping from the underfloor chamber and rising to co-mingle at the dome one of the oven with the hot gas 931 produced by the dome burner 930. In this way, hot combustion gas 7 from the underfloor burner 9, can accumulate underneath the horizontal barrier plate 903 separating the baking chamber 101 from the lower underfloor baking chamber 103 and the firebox 102. Hot gas in the space can be vented through ports and flues in the front, side or rear of the oven (see e.g. 906). This can provide independent ventilation for the dome burner 30, 930 heating the baking chamber 101 and the underfloor chamber 103 as it is heated by the underfloor burner 9. The oven may or may not have insulation 37 that covers the dome 1 walls 33, 38 and bottom 58 of the firebox. The insulation 37 may be ceramic wool, ceramic wool mixed with cement, vermiculite mixed with cement, loose vermiculite, or other high temperature insulation materials. The insulation 37 is preferably bounded on its outside surface by the outer wall or shell of the oven 302, 402, 502, 602, which is preferably made of metal sheet, ceramic, or any nonflammable material.

The floor 2 of the oven is preferably made of a refractory heat sink material or metal. Refractory materials are usually 2 inches (5.08 cm) to one fourth inch (0.63 cm) in thickness. Alternatively, the floors may be constructed of metal sheet, metal screen, or grills, positioned and rotated directly over an electric heat source, or other heat sources.

The diameter of the baking surface 50 and rotating oven floor 2 may be of any functional dimension, but is generally circular and between 12 inches (30.48 cm) and 30 inches (76.2 cm) in diameter. The oven floor 2 and baking surface 50 are preferably designed to accommodate a single pizza, or similar sized food. The distance between the floor 2 of the oven and the dome 1 of the oven is preferably 1 inch (2.54 cm) to 14 inches (35.56 cm). Thin metal plates 0.1 inches (0.254 cm) to 0.2 inches (0.516 cm) in thickness, or screens with rims, 0.2 inches (0.516 cm) to 0.4 inches (1.03 cm) in thickness may be used for the floor 2 of the oven in embodiments that use radiant electrical heat to bake the bottom of the pizza. Thicker ionized metal plates 0.2 inches (0.516 cm) to 0.5 inches (1.27 cm) in thickness may be used in embodiments of the oven that use induction to heat the baking surface 50. Ionizing metals, mixed with refractory concretes can also be used to make oven floor plates, 0.25 inches (0.635 cm) to 3 inches (7.62 cm) in thickness in embodiments that use induction for heating.

The baking surface 2, constructed of refractory material, metal screens 900 (as shown in FIGS. 9-11), metal sheets, or metal grills, is generally supported by an underfloor support structure 414 constructed to maintain the oven floor 2 in position and rotate it about a fixed vertical axis. The underfloor support structure 414 generally forms and underfloor chamber 103, wherein operate heating elements or burners 9 in close proximity to the underside of the oven floor 2, or wherein hot combustion gas pools directly under a rotating oven floor 2. The rotating underfloor support structure 414 may be made of steel or refractory material, or configurations of both steel and refractory material, other metals, or other high temperature materials.

Preferably, there is a small space 0.05 inches (1.26 mm) up to 0.125 inches (3.14 mm) between the oven floor plate 2 and the oven floor support structure perimeter wall 4, so that hot gas shown by arrow 35 pooling underneath the floor plate 2 may circulate around the complete bottom of the oven floor plate 2, and sides of the oven floor plate 2, for uniform heating by the hottest gas in the system. Cooler gas shown by arrow 32 escapes out from under the lower edge of the underfloor chamber 103 to co-mingle with combustion gas in the baking chamber 101, or leave the oven through a dedicated ventilation system and flue 906, or by some combination of both mechanisms. Automated baffles 905, 912, 952 can be used to divert under floor chamber gas 32, 932 to the dome 1 or a port and flue 906 to improve efficiency and more accurately regulate thermal conditions in the baking chamber 101.

The underfloor support structure 414 may turn on a solid axle 6 with the underfloor burner 9 off-center and next to the solid axle 6. The underfloor support structure 414 may turn on a hollow axle 45 with a rotating Venturi housing 41 on the bottom end, and a circular rotating burner 46 on the top end. This configuration allows the hollow axle 45 to conduct fuel from a fixed gas jet 64, after it is mixed with air in the rotating Venturi bell 41, through the axle 45 to the underfloor burner 46 for combustion. This burner 46 is constructed as an integral part of the underfloor support structure 414, turning with it, and the oven floor plate 2 and baking surface 50 above.

The underfloor support structure 414 may also be constructed of, or rest on a cylindrical steel drum 52, open at the top and at the bottom, supported and held in alignment by track bearings 51 articulating with a track 418 fixed along the outside circumference of the drum 52, or under the lower edge of the drum 52 to provide vertical support as well as alignment. This design is shown in FIG. 3. Other bearing systems are possible. The uppermost portion of this underfloor support structure 414 could be made of refractory material or metal, preferably with ports in the side of the cylindrical drum 52 for hot gas shown by arrow 32 to the vent and escape from underneath the underfloor chamber 103 to commingle with hot combustion gas in the baking chamber 101, or escape through a separate port and flue 906, as shown in FIG. 12. A central pedestal 53 with vertical steel walls would occupy the interior of the rotating steel drum 52 assembly and would contain the underfloor burner system 9, 59, 64, 65, the shaft and port 10 for infrared sensor 15 allowing readings at the target 3 on the bottom surface of the oven floor plate 2, and insulation 37 to prevent hot gas from heating mechanical elements, located in the lower portions of the oven structure, to temperatures beyond their operating range.

Thermal sensing at the dome 1 is preferably performed by positioning a thermocouple 36 just underneath the bottom surface of the dome 1 for sampling the temperature of hot gases in this location. Infrared sensors 15, located underneath the oven can also read the temperature of the dome 1 at a target 3 through a port 10 in the firebox floor 58 of the oven. Other light array sensors may be used for this purpose. Sensors using sound for heat measurement may be used for this purpose.

The thermocouple 36 leads are preferably connected to an oven controller 34, preferably a programmable electronic industrial controller with a digital display to show the temperature to the operator, and provide the measurement of the process value temperature so that the controller can close a relay opening the solenoid gas valve 26 when the process value temperature deviates by a specified value from a programmable set point. When the measured temperature is underneath the program set point by a programmed value, the controller 34 preferably closes the relay that powers the solenoid gas valve 26 causing it to open, increasing the air gas supply to the dome burner 30. This causes an increase in combustion and hot gas 31 production by the dome burner 30, and more hot gas 31 flows to the dome 1 raising the temperature of the dome 1. When the dome has reached target temperature, the relay opens and the solenoid gas valve 26 closes, and the gas supplied to the burner 30 is reduced, stopping the temperature increase at the dome 1. The fuel gas supplied to the dome burner system 30, 42, 43, 56 can be adjusted by a manual needle valve 29, positioned in the fuel supply line 27 to the solenoid valve system. In this way, the rate of increase of temperature at the dome 1 in the baking chamber 101 can be controlled during operation within the parameters of the burner system and oven architecture.

When the solenoid valve 26 is closed, the burner receives fuel supplied by a line 21 that bypasses the solenoid valve 26, preferably also adjustable by an in-line manual needle valve 28. This system is used to burn enough fuel to maintain the dome in a condition where it slowly loses temperature, once it has reached initial target set point temperature. Preferably, when the solenoid valve 26 is open, the dome 1 gains temperature, increasing temperature in the baking chamber 101, and when the solenoid valve 26 is closed, the dome 1 slowly loses temperature. In this way, the temperature of the dome 1, and the baking chamber 101 beneath it, is controlled in a range set at the controller 34, limited by the performance parameters of the dome burner system and oven architecture.

The temperature of the oven floor 2 is preferably controlled by measuring the temperature of the underside of the refractory oven floor plate 2 with an infrared sensor 15 that is located with the machinery in the lower and cooler oven support structure 414. Sensing of the temperature at the target 3 on the bottom surface of the refractory oven floor plate 2 preferably occurs through a vertically oriented shaft and port 10 in the floor 58 of the firebox. In this way the top of the oven floor plate 2, or the baking surface 50, it is not measured directly, but holding the temperature of the bottom of the thin oven floor refractory plate 2 effectively regulates the temperature of the baking surface 50 on the top side. Data from infrared sensor 15 readings is preferably conducted to a programmable oven controller 18 dedicated to the lower floor burner system. Deviation of the measured floor temperature reading from a set target temperature, by a set value, preferably causes the controller 18 to close a relay, powering a solenoid gas valve 20 that opens, and supplies increased fuel and air gas mixture to the underfloor burner 9 for combustion. This produces an increase in hot combustion gas 7 flowing to the underfloor chamber 103, impinging on the lower surface of the refractory oven floor 2, raising its temperature to target set point. Once this temperature is achieved, the controller preferably opens the relay and the solenoid gas valve 20 closes, reducing the air fuel gas mixture available to the burner 9, halting the increase in temperature of the bottom surface of the oven floor plate 2. When the solenoid valve 20 is closed, fuel is preferably supplied to the underfloor burner system 9, 59, 64, 65 by a bypass gas supply line 21 that is adjustable by a manual needle valve 22. This fuel supply is preferably adjusted so that when the solenoid valve 20 is closed, enough fuel is delivered to the underfloor burner 9 so that the temperature of the bottom surface of the oven floor plate 2 decreases slowly.

In this way, increases in the temperature of the bottom surface of the oven floor plate 2 are controlled and adjustable by setting the manual needle valve 12 in the solenoid valve gas supply line 19, and decreases in the temperature of the bottom surface of the oven floor plate 2, when the solenoid valve 20 is closed, are controlled by setting the manual needle valve 22 in the bypass gas supply line 21 system.

There are preferably two burner systems: The floor burner system and the dome burner system. The floor burner system includes underfloor burner 9, oven controller 18, solenoid gas valves supply line 19, solenoid gas valve 20, bypass gas line 21, manual needle valve 12, and manual needle valve 22. The dome burner system includes dome burner 30, solenoid valve bypass gas line 25, solenoid gas valve 26, solenoid valve gas supply line 27, manual needle valve for the bypass line 28, and manual needle valve for the solenoid valve gas supply line 29. For each burner system preferably four parameters are controllable. 1. The temperature set point is preferably controllable. 2. The deviation from this temperature set point that causes closing of the controller relay and opening of the solenoid gas valve is preferably controllable. 3. The amount of gas flowing through the solenoid valve when the solenoid valve is open is preferably controllable. 4. The amount of gas flowing through the bypass line when the solenoid valve is closed is preferably controllable.

Alternative burner control systems are possible. Proportional controls systems are possible. The amount of electrical, fuel, induction energy, or air for induction to solid fuel systems can be varied so that energy supply to the oven zone heating system is preferably proportional to the degree of deviations from the temperature set point.

Any light array sensor, or sensor using sound, or thermocouple in proximity, or infrared sensor positioned above, on the side of, or close to the surface of the rotating refractory floor can be used to measure the temperature of the oven floor plate 2, or the food cooking on top of the oven floor plate 2, or hot gas in proximity to the oven floor plate 2. Programmable electronic controllers may be used to vary the energy supply to electrical systems, gas infrared systems, induction systems, or solid fuel systems for the dome and the floor. Baffles 912 in the top of a firebox 102 can be used with actuators 914 for adjusting firebox baffles 912 to direct hot gas from solid fuel 910 to the dome 1 and baking chamber 101 or the floor 2 and the underfloor chamber 103 as required to maintain target temperatures at the dome 1 and the floor 2, as shown in FIG. 13.

The rotating underfloor support structure 414 and oven floor plate 2 can use multiple mechanisms to achieve rotation. For example, as shown in FIG. 14, the same fuel supply that heats the oven chamber may also be directed through a turbine 960 driven by jets 918 to power a mechanism 44 that causes rotation of the axel 6, 45 or drum 52 that supports the refractory oven floor 2. In an alternate embodiment (not shown), flywheels may be used to use kinetic energy provided by the operator to rotate the plate. Electrical motors with multiple mechanisms can be used to rotate the plate 2.

Illumination of the oven chamber is preferably accomplished by a light source 14 that is positioned in the lower cooler portions of the oven structure, shining up into the baking chamber 101, preferably through a shaft 13, and preferably through a port 8 in the firebox floor 58. In this way, the electrical bulb 14 is defended from hot combustion gases and thermal damage at high baking temperatures. Light flows from a relatively low cool area to the higher hot environment of the baking chamber 101. Reflection of light inside the oven chamber preferably provides enough illumination to see the top and bottom surface of the pizza during the cooking process.

Catering ovens 500, such as the embodiment shown in FIG. 4, are preferably supported on a four wheel 210 carriage that allows the operator to lean the oven back to a sharp angle so that it can fit into a conventional service van. Once the oven 500 is wheeled into a position for operation, it is preferably lifted into a higher upright position convenient for baking pizza (as shown in FIG. 4). Catering ovens 500 preferably operate on 12 V DC and 120 V AC supplies. They are built to defend the electronics and mechanical components from water damage from rain and condensation. Catering ovens 500 may include equipment that allows the oven to climb stairs. Powered mechanisms for driven wheels may also be used.

The oven 100, 200, 300, 400, 500, 600, 901, 915 may operate with or without ventilation systems. Ventilation systems may include conventional hoods, ventilation systems attached to outside of the oven structure. Blower systems operating from above and below the oven may be used to remove hot combustion gas from the cooking area to the outside environment, or blow cool air into the underside of the oven for ventilation of mechanical and electrical parts or blow cool air into the dome 1 and the baking chamber 101 for cooling should the dome heat to an over target temperature condition.

Embodiments of the oven may also use programmable logic controllers 322 to automate start and stop cycles, provide shutdown when thermal limits are exceeded, provide shutdown when free fuel gas is detected in the oven structure, provide shutdown when moving parts fail to operate, provide for regulated air supply and drafting for efficient combustion, provide for automated indication of malfunctioning systems, provide for accounting of hours of operation, provide for Wi-Fi cellular or Internet communication with the oven from remote locations for maintenance, and provide for timer with alarm to indicate ending of the bake cycle. Electronic ignition systems, flame sensing systems, automated ventilation systems can be used.

Burner systems heating systems or other systems that provide thermal energy to maintain a heat sink or heat the pizza directly may be fixed or moving.

Programmable logic controllers 322 may be used to automate the actual bake cycle. A series of set points programmed as a function of time may be used to adjust fuel supply and temperature regulation during the baking cycle. In particular, heat energy can be added to a stone 2 that has just received the cold pizza, when the top of the oven floor refractory plate 50 begins to lose temperature, and before the temperature at the bottom of the stone 2 drops. The amount of heat supplied to the stone 2 is preferably measured and calibrated to offset losses occurring immediately upon the occasion of a particular pizza, during particular target thermal baking conditions, being exposed to the surface of the oven floor 50 and the baking chamber 101.

The dome 1 heat sink is generally fabricated from refractory concrete. Any ceramic material, brick, stone, tile, metal or other high temperature material with mass that holds heat could be a suitable material for the dome heat sink. Ovens using electrical resistance elements, or induction systems, or gas heating systems with controls that vary heat production based upon deviation of ovens owned temperature from a target set point may not require heavy dome heat sinks. In this instance, very thin metal or refractory materials can be used with thicknesses as low as 0.028 inches (0.071 cm). The refractory concrete dome heat sinks depicted in the figures are generally three fourths of an inch (1.905 cm) to 1 inch (2.54 cm) thick, but may be as thin as one fourth of an inch thick (0.635 cm), or as thick as 4 inches (10.16 cm). The dome 1 generally covers the top of the baking chamber 101, over an area, generally 18 inches (45.72 cm) wide and 17 inches (43.18 cm) in depth, in ovens with a 16 inch (4.64 cm) rotating circular floor. Larger domes 1 are required for ovens with larger floors 2. If the floor 2 of the oven is 28 inches (71.12 cm) wide, the dome 1 may be as wide as 32 inches (81.28 cm), and as deep as 42 inches (106.68 cm). The dome heat sink may also cover only a portion of the dome 1 of the oven; dome coverage by heat sink material may be as much as 100% and as little as 20%, of the surface area of dome 1 of the oven, but generally occupies about 70% of the dome 1 surface area. The same dome 1 may be made of two different materials, such as stainless steel and refractory concrete. Any combination of refractory material or metal or stone or brick or tile may be used. The dome 1 is generally suspended 4 inches (10.16 cm) above the baking surface 50, but may be as close as 1 inch (2.54 cm) from the baking surface 50, and as high as 14 inches (35.56 cm) above the baking surface 50. Domes 1 may be constructed in a flat plate shape, but other shapes may be used to change air turbulence and pooling of hot gas inside of the oven dome 1. Baffles or other structures made of metal or refractory materials may be used in the area just underneath the dome 1 to deflect and retain hot air inside of the oven (not shown). Baffles may also be suspended from the dome 1, or integrated with the construction of the dome 1, or held in proximity to the dome 1 by the oven walls 33, 38, to achieve desired airflow characteristics in the baking chamber 101

(not shown). The dome 1 may be perforated to allow thermocouples 36 or other equipment to penetrate into the baking chamber 101. Laminations of different materials may also be used to construct the dome 1. The dome 1 may also be constructed so that it is circular and rotating.

The floor plate 2 is generally three fourths of an inch (1.90 cm) to 1 inch (2.54 cm) in thickness, and constructed from refractory concrete designed to function as a heat sink, but may be as thin as one fourth of an inch (0.635 cm) or as thick as 4 inches (10.16 cm). Thin metal floors 2 may be as thin as 0.0218 inches (0.055 cm) in oven designs that use proportional response heating systems like electrical resistance or induction systems, in close proximity to low mass conductive oven floors. The circular plate like oven floor 2 is generally 16 inches (40.64 cm) wide, but may be as wide as 30 inches (76.2 cm), or a narrow as 12 inches (30.48 cm). The floor heat sink 2 is generally made of refractory concrete, but others ceramic materials, rock, metal, or other high temperature material suitable for holding heat energy in mass can be used. Similarly, ovens with conductive floors can be made of many types of thin conductive metal, like aluminum, or steel, and these floors may be perforated, formed into grids screens or grates. The oven floor 2, baking surface 50, and heat sink can be formed to accommodate fasteners that secure it to the oven floor support structures 414. The rotating oven floor heat sink is generally located in a horizontal plane about 1 inch (2.54 cm) from the oven walls 33, 38, on the sides of the oven, but this distance may be as high as 3 inches (7.62 cm), and as low as ⅛ of an inch (0.318 cm). Generally the rear of the oven floor is 3 inches (7.62 cm) from the back wall 412 of the baking chamber 101, but may be as far as 8 inches (20.32 cm) away, or as close as one half inch (1.27 cm) away from the rear wall 412. The oven floor 2 and it's support structure 414 protrude from the front of the oven, generally, 2 inches (5.08 cm), but the protrusion may be up to one half of the diameter of the oven floor, up to 14 inches (35.56 cm) in large ovens with large oven floors, or the oven floor 2 and the oven floor support structure 414, may not protrude at all, staying totally contained inside the baking chamber 101 formed by the oven dome 1 and walls 33, 38.

The oven floor 2, and baking surface 50, are generally supported by a rotating oven floor support structure 414 at a distance of 6½ inches (16.51 cm) above the gas burner 9 that heats the oven floor 2 from the bottom, but this distance could be as high as 16 inches (40.64 cm), or as low as 0.05 inches (0.127 cm) in ovens where an electrical resistance elements or induction elements are maintained in close proximity, or as large as 1 inch (2.54 cm), or as small as ⅛ inch (0.318 cm), to a thin conductive oven floor, 0.1 inches (0.254 cm) to 0.25 inches (0.635 cm). The baking surface 50 is generally about 8 inches (20.32 cm) from the floor of the firebox 58 but may be as high as 16 inches (40.64 cm), or as low as 0.04 inch (0.102 cm). The distance between the bottom of the oven floor 2 and the top edge of the burner 9 can be as large as 14 inches (35.56 cm) or as small as 0.05 inches (0.127 cm) in designs where electrical resistance elements are used in close proximity to a thin metal 0.1 (0.254 cm) to 0.25 inch (0.635 cm) conductive oven floor plate 2. The cylindrical oven floor support structure 414, is constructed wide enough so that a cylindrical oven floor plate 2 can be contained inside the inside upper edge of the vertical perimeter wall 4, 39 of the oven floor support structure 414. The outside diameter of the stainless steel cylindrical perimeter wall 4 for the underfloor chamber 103 is generally about one fourth of an inch (0.635 cm) larger than the oven floor plate 2, which has general dimensions of 16¼ inches (41.275 cm) in diameter, but ranges up to 32¼ inches (81.91 cm), but may be as small as 12¼ inches (31.11 cm), in ovens that are larger and smaller. The cylindrical perimeter walls 4, 39 of the underfloor support structure 414 are generally 4½ inches (11.43 cm) in height, but may be as tall as 10 inches (25.4 cm), or as short as one fourth of an inch (0.635 cm) in height. Steel versions of the oven floor support structure 414 are generally fabricated out of stainless steel plate, 0.109 inches (0.277 cm) in thickness, but may be as thick as 0.3 inches (0.762 cm) or as thin as 0.015 inches (0.038 cm). Other metals may be used including aluminum and iron. The walls of the oven floor support structure 414 may also be fabricated out of refractory concrete, or other ceramic materials, generally 1.5 inches (3.81 cm) in thickness, but may be up to four inches (10.16 cm) in thickness, or as thin as one half inch (1.27 cm). Refractory oven floor support structure walls may be supported by pillars 48 made of refractory concrete or other ceramic materials that are generally 3½ inches (8.89 cm) in height, but may be as high as 8 inches (20.32 cm), or as low as one half inch (1.27 cm) in ovens with electrical resistance element or induction designs using a conductive oven floor 2 or screen 900.

The sampling field 3 for the infrared sensor 15 on the bottom of the oven floor plate 2 may be as large as 4 inches (10.16 cm), or as small as one thousands of an inch (0.003 cm), depending on the design of the infrared sensor 15. Generally, the sampling field is about 1 inch (2.54 cm) in diameter, for a sensor 22 inches (555.88 cm) underneath the bottom surface of the oven floor plate 2. Sampling may be performed anywhere between the center and perimeter of the bottom surface of the oven floor plate 2.

Hollow axle ovens 200 are built with a central circular burner 46 that is welded, on its bottom surface to a hollow axle 45. Radial supports 5 are welded to the sidewall of the burner 46 centrally, and they are welded to metal channels 47 to receive refractory pillars 48 supporting refractory vertical perimeter walls 39, or directly to stainless steel plate pillars supporting vertical stainless steel perimeter walls. The vertically oriented perimeter walls 39 are generally 4 inches (10.16 cm) high but may be up to 12 inches (30.48 cm) high, or as low as one fourth of an inch (0.635 cm). Radial support structures 5 are generally 8 inches (20.32 cm) in radial dimension, but may be up to 15 inches (38.10 cm) in radial dimension in large ovens, or as small as 5 inches (12.7 cm) in radial dimension, in small ovens. Radial supports 5 are generally constructed out of stainless steel plate, but carbon steel, aluminum, or other metals may be used. Plate thickness is generally 0.109 inches (0.277 cm), but may be as high as 0.3125 inches (0.794 cm), or as low as 0.023 inches (0.058 cm). The upper edge of the radial support 5 is generally recessed ½ inch (1.27 cm) from the upper edge of the wall 4 of the oven floor support structure 414, but the recess may be as large as 3½ inches (8.89 cm), or as small as no recessed dimension at all.

Radial support structures 5 may have perforations or cutouts to change the circulation of gas underneath the oven floor plate 2 to cause even heating. Radial metal oven floor support structures 5 may be configured to receive refractory underfloor support structure perimeter vertical walls 39, made of refractory concrete, ceramic, or other refractory materials. These vertical perimeter walls 39 may also support the refractory concrete oven floor plate 2. These structures are generally separated by 0.070 inches (1.78 cm) to allow hot gas to vent around the outside edge of the oven floor plate 2. Radial oven floor support structural elements 5 may also be constructed of refractory concrete or other refractory materials. The oven floor plate 2 and refractory oven floor support structure vertical perimeter walls 39 may be fabricated as a single piece. Refractory concrete vertical wall perimeter supports are generally attached to supports or pillars 48 around the bottom boundary 49 of the walls 39, allowing hot gas to escape between the vertical support legs or pillars 48 generally measuring 3 inches (7.62 cm) in height. These pillars 48 may be as tall as 8 inches (20.32 cm) or as low as one half of an inch (1.27 cm) above the heat source for the underfloor chamber. Metal or refractory material perimeter walls 39 and the legs or pillars 48 that support them and allow hot gas to escape from the underfloor chamber 103 above may be supported by the edge of a rotating steel drum 52, generally constructed of steel plate, 0.109 inches (0.276 cm) in thickness, rolled to a diameter of roughly 16 inches (40.64 cm). Such underfloor drum 52 structures are generally 8 inches (20.32 cm) tall with a belt or a gear drive mechanism 44, 57 articulating with the surface close to the lower edge of the drum 52. Such drum underfloor support structures 52 are generally supported and held in alignment by track bearings 51. A pedestal structure 53 is arranged in the center of the hollow cylinder drum 52 oven floor support structure. The central pedestal 53 may support the rotating drum 52 itself. Alternatively, track bearing supporting the rotating drum can be supported by vertical support members located outside of the periphery of the rotating drum. Rotating drum 52 oven floor supports may be as wide as 30 inches (76.2 cm), and as tall as 20 inches (50.8 cm). Track bearings 51 are generally stainless steel with stainless steel ball bearing construction. The drum oven floor support structure is generally revolves around a structure in the center of the drum, or pedestal 53, supported by the general oven support structure and held in alignment inside the drum forming, at its topmost surface, a firebox floor, inside the drum 52, under the rotating oven floor plate 2. This pedestal 53 houses the underfloor burner 9 or heating system, and provides for a shaft and port 10 to measure the temperature of the bottom of the oven floor plate 2 using infrared sensors 15 or other light array sensors or sonar sensors. Other heat sensor arrangements are possible in this pedestal structure 53 at the center of the rotating drum 51 support structure. See e.g. FIG. 3.

Solid axle ovens 100 have axles that are generally made of stainless steel, generally 1 inch (2.54 cm) in diameter. Carbon steel, aluminum, other metals may be used. The axel 6 may be as large as 2 inches (5.08 cm), or as small as 0.203 inches (0.515 cm). In ovens with hollow axles 200, conducting air gas mixture to burners 46 integral with the underfloor support structure 414, or ovens using the lumen of the pipe to conduct electrical energy, sensor cables, the axle 45 is generally constructed of 1 inch (2.54 cm) inner diameter stainless steel pipe, but the pipe may be as large as 3 inches (7.62 cm), or as small as one half inch 1.27 cm). The bottom end of a hollow shaft axle 45 is generally attached to a Venturi bell 41, 3 inches (7.62 cm) in diameter, but Venturi bells 41,42, 59 may measure up to 6 inches (15.24 cm) in diameter, or as small as one half inches (1.27 cm) in diameter. Hollow axle designs include attachment to a burner 46 at the top of the axle 45, which is generally attached to the carousel radial support structures 5. Oven axles 45 are generally 23 inches 58.42 cm) in length, but may be up to 66 inches (167.64 cm) long, or as small as 3 inches (7.62 cm) in height. The axel may be placed almost on top of the firebox floor 58, or be separated from it generally 1 inch (2.54 cm), but this distance may be as high as 16 inches (40.64 cm). In the oven structure, the axle 6, 45 is preferably located at the center of the rotating circular oven floor 2. It may be centered in the structure of the oven, or located off-center, to allow a chase for hot gas 31 heating the dome 1 of the oven, other equipment, or protrusion of the underfloor support structure 414 and floor 2 from the face of the oven and the fire box 102.

Light ports 8 are located in the floor 58 of the firebox 102 allowing a beam of light to be projected from a cool location physically underneath the oven, into the baking chamber 101 where light is diffused by diffraction. Light ports 8 are generally 2 inches (5.08 cm) in diameter, or 2 inches (5.08 cm) and square, but may be up to 5 inches (12.70 cm) in diameter or 5 in (12.70 cm), in width and depth, or diameter, or as small as one half of an inch (1.27 cm) in diameter or width and depth. The light shaft 13 is generally a physical structure, generally stainless steel square tubing, but possibly round or square tubing made out of aluminum carbon steel, any other metal material, or any other temperature resistant material capable of blocking light, that contains the beam of light from the underfloor location of the light source 14, generally 9 inches (22.86 cm) below the firebox floor 58, but up to 24 inches (60.96 cm) from the firebox floor 58, or as close as 2 inches (5.08 cm) from the firebox floor 58 when using heat resistant bulbs 14. Light is conducted through this shaft 13 that extends through the layers of insulation 37, up to ½ inch (1.27 cm) above the firebox floor 58. The light port 8 and light shaft 13 may also be simple open space, and not a physical structure. The shape of the light port 8 may also be irregular, triangular, or arrange conduction through the wall 33 of the oven.

Heating systems for the dome 1 and oven floor 2, in solid axle 6 carousel designs 100 and drum designs 300, are generally fixed position gas burners 9, generally constructed from 1 inch (2.54 cm) inner diameter stainless steel pipe with round perforations arranged in a pattern or linear fashion on the top surface of the pipe, contiguous to one another to allow the escape of air fuel mixtures from the lumen of the pipe to the area of combustion, just above the burner 9, along its entire length. Steel tubing sizes may be as large as 3 inches (7.62 cm), or as small as one half inch (1.27 cm). The burner is generally 2 inches (5.08 cm) shorter than rear 412 or side wall 33 of the oven bounding the edge of the hot gas chase as it moves around the oven floor support structure 414 and the oven floor 2. In solid axle fixed burner carousel designs as shown in FIG. 1, the dome burner 30 and underfloor burners 9, both fixed, may be welded together in a structure resembling a "T", allowing the burners to share ignition. Dome burners 30 may be located in the rear of the oven, on the side of the oven, in a vertical location from the firebox 102 to close proximity to the dome 1 of the oven. Air fuel mixtures supply piping 65 is attached to the bottom surface of the burner pipe 9, and protrudes through the bottom of the firebox floor 58 and lower insulation 37, where it is attached to a Venturi 59, generally three inches (7.62 cm) in diameter, possibly measuring up to 5 inches (12.70 cm) in diameter, possibly being a small as one and a half inches (3.81 cm) in diameter. Underfloor gas burners 9, 46 are generally positioned 7½ inches (19.05 cm) underneath the bottom surface of the oven floor plate 2, but may be as high as 14 inches (35.56 cm), or as close as 1 inch (2.54 cm) in gas systems. Other gas burners, including those operating with proportional controls, gas burners of other shapes, burners using infrared systems, or solid fuel systems using baffles may also be used. Heating systems using electrical resistance elements or coils for induction systems must be constructed so that these structures allow a sampling field for the infrared sensor 15 measuring the temperature of the moving oven floor 2 at a sampling field 13 on the bottom surface. The sampling field is generally 2 inches (5.08 cm) in diameter, but may be as small as 0.008 inches (2 mm), or as large as 4 inches (10.16 cm). Electrical resistance and induction elements are generally located 0.05 inches (0.127 cm) away from the oven floor plate, but this distance may be as low as 0.017 inches (0.043 cm), or up to 0.281 inches (0.714 cm). In dome electrical resistance systems, the element may be suspended from the dome 1 up to 1 inch (2.54 cm). Electrical resistance elements may generally be positioned one to 4 inches (10.16 cm) away from the top of the oven floor plate 2, or baking surface 50. Coils for induction systems heating the dome 1, are generally located over the ionizing metal dome, outside of the baking chamber 101 and firebox 102.

Moving burner systems may also be used as shown in FIG. 2. Designs using a burner 46 system that is constructed as an integral part of the rotating underfloor support structure 414 may use a hollow axle 45 to conduct air fuel mixtures from a Venturi bell 41 that is moving and positioned at the lowermost portion of the rotating hollow axle 45. A fixed gas jet 64 supplies fuel into the Venturi bell 41 for mixture with air to provide the appropriate air fuel gas mixture for the burner 46 above that rotates with the hollow axle 45 conducting the air fuel gas mixture to the burner 46. Designs with fixed or moving oven floors 2 and domes 1 are possible with heating systems that can be fixed or moving using the fixed gas jet rotating Venturi bell 41, or brush type moving electrical contacts for electrical and induction systems. Fixed gas supply jets 64, and fixed Venturi bells 59 may also be attached to different mechanical structures rather than being joined.

Ports in the firebox floor 58 for infrared sensing are generally 2 inches (5.08 cm) in length and depth, generally protruding ½ inch (1.27 cm) above the firebox floor 58, extending through the insulation layer 37 to a location ½ inch (1.27 cm) below the oven skin or cabinet 202, 302, 402, 502, 602 containing the insulation 37, at the lower surface of the oven. These ports 8 may be as small as one fourth of an inch (0.635 cm) in diameter, or length and depth, square. They may be as large as 3" (7.620 cm)×3" (7.62 cm) in width and depth. Physical structure is not necessarily required for this function, as only physical space as required to accommodate the infrared sensor 15 beam.

The upper plate bearing 11 is generally purchased as an industrial part, generally stainless steel ball bearing prefabricated and accommodating a 1 inch (2.54 cm) shaft, generally about 4 inches (10.16 cm) in diameter, generally approximately 1 inch (2.54 cm) in height, generally constructed for high temperature specifications for the upper bearing plate. Plate bearings, or other bearing systems, may accommodate axles 6, 45 as little as ³⁄₁₆ inch (0.187 cm) in diameter or as large as 3 inches (7.62 cm) in diameter. Generally bearings 11, 16 mount to a square steel plate design to receive four bolts. Collars are used on the axle 6, 45 shaft to keep the shaft supported in a vertical dimension by the bearing 11, 16.

Manual gas needle valves 23, 29, 28, 12, 22, are generally used to regulate gas flow in propane systems, generally, using 0.025 inch (0.064 cm) stainless steel tubing. In systems using on off solenoid gas valves 20, 26, needle valves 12, 22, 23, 28, 29 are required for the gas supply lines 19, 27 using solenoid valves 20, 26, and the bypass lines 25, 21, Preferably a needle valve 23 is also used to control the flow of gas to the entire oven via a main valve 24. In systems using proportional controls, manual needle gas valves may be used to turn the supply of gas off and on to the entire system. Solenoid valves may also be used in place of needle valves in systems that are regulated by a programmable logic controller 322. Manual gas valves generally may be used in any part of a gas supply system where manual regulation of gas flow is required for oven tuning and operation. Ball valves and other gas valve types are used depending upon the pipe diameter and gas type. In electrical systems, manual needle gas valves will be replaced by manual variable resistors. In automated systems, using programmable logic controllers 322, or other automated oven controlling systems, solenoid gas valves can be used as well as actuator operated proportional gas valve systems. Electronic systems use manual variable resistors for this purpose, as well as relays accommodating variable input and providing proportional current output. Generally, high-pressure propane ovens use ¼ inch (0.635 cm) OD steel tubing for gas supply lines 19, 21, 25, 27, but natural gas systems generally require larger piping and valve orifices, up to 1 inch (2.54 cm) inner diameter. Systems conducting electrical energy use wire, with the specifications required for their current load.

The light source 14 for the oven is generally a light-emitting diode, or multiple diodes arranged on array on a circuit board with a resistor. Incandescent, halogen, or other light sources may also be used. Light emitting diodes constructed to produce a narrow light beam are preferred.

Infrared sensors 15 are generally used to measure the temperature of the rotating oven floor plate 2. Other light array sensors or sensors using sound, or moving contact thermocouples could be used for the same purpose. Generally, a 24 volt DC infrared sensor is used with a lens that provides a 1 inch (2.54 cm) sampling field 3 using a sensor approximately 22 inches (55.88 cm) away from the bottom of the oven floor plate 2. The sensor 15 may be located as far away as 60 inches (152.4 cm) away underneath the oven floor plate 2, or as close as one half inch (1.27 cm) away using high temperature sensors with special air or water cooling jackets or other cooling systems. Similar systems could be used to measure the temperature of the side or top of the oven floor plate 2, with or without shafts and ports 10 providing a more remote location to keep the sensor 15 cool. Infrared sensors 15 may be located inside hollow axle carousel ovens 200. 12 V DC, 120 V AC, 240 V AC power supplies can also be used. There are multiple options for sensing field specifications, including sensors 15 specific for shiny metal in ovens with metallic oven floor plates.

Oven controllers 18, 34, are preferably industrial oven controllers with a 24 V DC power supply are used with J thermocouple 36 inputs and on off output relays to switch solenoid valve 20, 26 supplying gas for independently controlled burners for the dome 30 and floor 9,46. Generally, these controllers 18, 34 contain electronic systems to accomplish this feature as well as programmable logic computer systems to regulate the ramp and soak of ovens. Preferably the oven controller 18, 34 operates using a simple hysteresis cycle with ramping beginning when the process temperature is 20° F. (9.43 C) below the set point temperature. Other settings are possible. Proportional control systems may also be used systems where the electronic signal generated by the controller varies in proportion to process value deviations from set point. These controllers would be used with proportional response gas valves, electrical element relay systems with variable resistors, and induction systems with variable resistor relays, actuator driven baffles or movable burner systems, or other means of proportional control relative to a variable controller signal. Any computer system using software designed to receive thermal sensor data and translate it to an on-off electrical relay function, or any signal for gas valve solenoids or proportional controllers or actuators, proportional response relays for electrical resistance and induction systems, or any other electronic or computerized controllers designed to regulate burner energy output from a variable input may be used, such as programmable logic controllers with thermocouple inputs, and computer systems with thermocouple interfacing with off one or proportional current relay outputs.

The oven generally uses a mechanical J type thermocouple 36 to measure the temperature of the hot air, three fourths of an inch (1.9 cm) under the refractory oven dome 1, in the baking chamber 101. K type and other thermocouples can also be used. Infrared sensors 15, other light array sensors, sonar sensors, may also be used, as well as other thermocouple locations, including locations inside the baking chamber 101, exactly at the surface of the oven dome 1, or up to 3 inches (7.62 cm) below the oven dome 1. The dome heating systems can receive heat sensing input from any part of or location in the oven baking chamber 101.

Measurement of the temperature at the top of the pizza, or the baking surface 50, on the top of the oven floor plate 2, can be performed through ports in the top of the pizza oven, dome 1 insulation 37 and top skin or cabinet 202, 302, 402, 502, 602, using power ventilation to cool environment so that infrared sensors 15, or other light array sensors can be maintained outside of and above the oven measuring the temperature of the baking surface 50 from this remote location, one inch (2.54 cm) to twenty five inches (63.5 cm) above the baking surface 50. Such sensors are not particularly useful for regulation of the temperature of the oven dome 1, but do reflect the actual temperature of the baking surface 50 for setting the oven. Such "dome ports" would generally be 0.3 inches (0.762 cm) to 2 inches (5.08 cm) in width.

Oven walls 33 are generally constructed out of stainless steel in portable food truck 400 or catering ovens 500. Other metals may be used, including aluminum and carbon steel. Stainless steel oven walls are generally 0.109 inches (0.277 cm) in thickness, but may be as thin as 0.043 inches (0.109 cm). In ovens that are not subject to excessive movement and harsh repeated mechanical stress of movement, refractory materials may be used, such as refractory concrete, brick, tile, or others ceramic materials. The oven walls 33, 38, 412 may be formed as a complete dome 1 and oven wall structure, fabricated as a single part. Steel or refractory parts may be attached to the oven walls 33, 38, 412 to provide baffling of hot gases, the redirection of hot gases, or a stop to prevent the pizza from sliding off the circular rotating oven floor 2 into the firebox 102.

The oven structure, with its insulation 37 and outside skin 202, 302, 402, 502, 602, including burner systems drive mechanisms sensor systems bearing systems is generally supported by aluminum or a steel frame that connects to a system of wheels that sit on the floor to allow easy movement of the oven for cleaning the floor space underneath, even in residential and fixed position industrial applications. More elaborate systems for supporting the oven, including wheel systems that allow the oven to be tilted as shown in FIG. 4 so that it can fit inside of a vehicle, are used. Drive systems to help move the oven are also possible. Designs with mechanical bases to adjust the height of the baking surface 50 may be constructed using gears or pneumatic cylinders. The oven may fit into a cut out in a counter 410 as shown in FIG. 7, or steel plate of any kind, so long as provisions can be made for the location of the gas plumbing and adjustment knobs underneath the oven, as well as location of the electrical control box, light source 14, infrared sensor 15 from the location under the firebox floor 58, and insulation 37, and skin 202, 302, 402, 502, 602 at the bottom of the oven. This location could be behind conventional cabinet doors.

The floor 58 of the firebox 102 is generally constructed out of stainless steel, but other metals may be used, as well as refractory materials. Multiple shafts for axles 6, 45, infrared sensor 15 function, venting, burner supply piping 65 and light perforate the firebox floor 58 and are generally constructed of stainless steel tubing, but other metals may be used. A physical structure is not required for the shafts, but, at a minimum, the potential space must be available for the structures that must protrude into the oven through space underneath the bottom surface of the oven floor plate 2 and the dome above 1.

Pizza or other food may be baked directly on the oven floor plate 2, on the baking surface 50, or may be conveyed to that surface by means of a screen 900, constructed to suspend the pizza, preferably 0.0312 inches (0.079 cm) to 0.188 inches (0.478 cm) above the oven floor plate 2. This allows the pizza to bake, suspended in hot air, to the point of desirable bottom surface texture without burned flour or too many black marks on the bottom of the pizza, both undesirable for a domestic pizza production. Unconventional mesh type pieces screen with a wire, preferably measuring 0.1 inches (0.254 cm) in diameter positioned through the middle of the screen 900 to hold the center of the pizza above the top surface of the oven floor plate, in the middle, an area, prone to burn. Other wire positions are possible as shown in FIGS. 9-11.

In a preferred embodiment of the present invention shown in FIG. 12, described as an "Inverted" Oven 901, the following special considerations are included:

Traditional refractory pizza ovens have a fire in the baking chamber that heats the dome 1 and the floor 2 of the oven such that the hot gas from the fire rises to the dome 1, heating the dome 1 preferentially and generally causing it to be hotter than the floor 2. The floor 2 is heated by radiant energy from the dome 1 and fire.

In a preferred embodiment of the present invention, an oven is described with a first regulated heat source 9 underneath the floor of the oven and a second regulated heat source 30, 930 dedicated to heating the dome 1 of the oven. If the dome burner 30, 930 is turned down, or even off, a condition results where the floor 2 of the oven becomes substantially hotter than the dome 1 of the oven. We refer to this condition as the "inverted" oven. This does not occur naturally in conventional refractory pizza ovens.

This condition is particularly useful for baking a pizza on a screen 900 at high temperature, such as those shown in FIGS. 9-11. Because the screen 900 introduces thermal inefficiency, higher temperatures are required on the floor 2 than the dome 1 for the pizza to be completely baked on the top and the bottom at the same time. The screen 900 allows the pizza to bake suspended on a mesh metal screen in hot air instead of in contact with hot stone or floor 2, reducing the amount of black marking on the bottom of the pizza which is unattractive to domestic consumers. Baking on a screen 900 also allows the pizza to be more easily handled, moving in and out of the oven through an open door 63. Baking on a screen 900 also allows loose flour to fall from the pizza onto the floor 2 where it becomes soot. The pizza is removed from the oven through the open door 63 without the light ash from burnt flour covering the bottom of the pizza. In traditional pizza making there is usually some burnt flour or ash on the bottom of the pizza. We do not feel that this is a positive. This phenomenon requires that the floor 2 or stone be cleaned on a regular basis with a brush or a wet rag.

It is possible to efficiently bake a pizza in a pizza oven with one underfloor regulated burner system 9, 46 heating the dome with radiant energy from the floor 2 and hot gas 32, 35 from the underfloor burner 9. The difference in the temperature of the floor 2, and the baking surface 50 and the dome 1, and baking chamber 101, or temperature gradient between the hotter floor 2 and the cooler dome 1 is determined by the architecture of the oven baking chamber 101 and the dome 1. Static architectural characteristics that can be modified include: the mass or thickness of the dome 1, the material used to fabricate the dome 1, the coverage of refractory heat sink material as a percentage of the entire surface area of the dome 1 of the oven, the amount of insulation 37 that is used to reduce heat loss from the dome heat sink 1, the distance between the floor 2 of the oven and the dome 1, the amount of oven floor 2 that is uncovered by dome 1, the shape of the dome 1, and the addition of baffles 905, 912, 952 restricting hot gas flow out of the oven at the open door 63.

This invention would include single chamber pizza ovens with rotating floors and a single underfloor regulated heating system, providing heating of the dome 1 by radiant energy from the oven floor2 and hot gas 32, 35 from the underfloor burner 9, 46 system flowing to the dome 1 of the oven. This oven produces baking conditions where the floor 2 temperature is significantly hotter than the dome 1 and baking chamber 101 temperature, which is particularly conducive to baking pizzas at high temperature on screens 900. The temperature gradient between the floor 2, and baking surface 50 and dome 1, and baking chamber 101 can be modified by changing the static architectural characteristics of the dome 1 and walls 33, 38 of the oven.

It is also possible to adjust to the architecture of the pizza oven to accommodate cooling of the dome 1 and baking chamber 101 by using movable architectural pieces. Manually adjusted baffles 905, 912, 952, may provide additional ventilation to the dome either by passive drafting or powered negative pressure ventilation. The dome 1, with or without the insulation 37 above the dome 1, with and without the oven skin or cabinet (not shown in FIGS. 12-14), may be hinged at the rear front or sides so that one side of the dome 1 lifts up to allow the escape of hot gas accumulating under the dome 1, and increasing the distance between the dome 1 and the oven floor 2 and the cooking pizza. In a similar way, the dome 1 of the oven may slide back on the oven structure, opening the oven floor 2 so that a larger percentage of the baking pizza on the oven floor 2 is uncovered by dome 1 (not shown). Less heat can be retained by the oven dome 1 over the baking pizza (not shown).

Automated systems for dome 1 cooling are possible. An industrial oven controller 18, 34 can turn a negative pressure ventilation fan off or on depending on input from a thermal sensor at the dome 36. In a similar way, cool air can be ported from the lower oven structure to the dome 1, cooling the dome 1, turned off and on by an industrial oven controller 18, 34 using a thermal sensor at the dome 36 to activate the air pump motor. Movable domes 1 that open and close depending on the temperature at the dome 1, can be positioned by actuators controlled by industrial oven controllers sensing the temperature at the dome 1. Movable baffles for additional dome ventilation can also be positioned by actuators controlled by an industrial oven controller or other programmable logic controller sensing the temperature at the dome and its deviation from a set point.

The present invention would include pizza ovens that use manual adjustments of dome architecture or baffles for the ventilation of the dome, and pizza ovens that use industrial oven controllers or other programmable logic controllers with thermal sensing equipment to switch fans to provide negative pressure or positive airflow to the dome 1, and actuators to move domes 1 and baffles to provide additional ventilation to the dome 1 for cooling in order to maintain an adjustable desired temperature gradient between the oven floor 2 and the oven dome 1.

PARTS LIST

The following is a list of parts and materials suitable for use in the present invention:

PART NUMBER DESCRIPTION 1 dome/top of baking chamber (preferably made of PLI-CAST HymorKK 55 lbs TSR Plus Castable Refractory, TFL Houston)
2 floor plate (preferably made of PLICAST HymorKK 55 lbs TSR Plus Castable Refractory, TFL Houston, 14626 Chrisman, Houston Tex. 77039, USA)
3 sampling field of infrared sensor
4 perimeter wall of cylindrical oven floor support structure (preferably made of standard 12 gauge (0.109 inches, 2.768 mm) stainless steel plate)
5 radial support members (preferably made of standard 12 gauge (0.109 inches, 2.768 mm) stainless steel plate)
6 rotating solid axle (preferably standard 1 inch round stainless steel bar (2.54 cm))
7 flame representing hot combustion gas
8 light port (preferably thin wall square stainless tubing, 2 inches square (50.8 mm))
9 underfloor burner (preferable made of 1.25 inch (31.75) outer diameter round stainless steel pipe with an inner diameter of 1 inch, (2.54 cm))
10 port for infrared sensing (preferably made of 2 inch (50.8 mm) thin wall stainless steel tube)
11 upper plate bearing support
12 manual needle valve (preferably 850-BRF-SP, by Tejas Smokers, 4747 Darien St., Houston, Tex., 77028-5915 USA)
13 light shaft (preferably 2 inch (50.8 mm) thin wall stainless steel tube)
14 light source (such as 1000 lumen LED, Amazon, Superbright USA Made)
15 infrared sensor (such as Microepsilon, Conn.-SF22-C1, 8120 Brownleigh Dr. Raleigh, N.C., 27617)
16 lower plate bearing (Such as FC-DLM-100 by Motion Industries, 5625 Salmen St. Harahan, La., 70123 USA)
17 drive mechanism (such as belt 150L050, by Goodyear, 200 Innovation Way, Akron, Ohio, 44316-00001, with gear motor 2L0062L006 by Grainger 601 S. Galvez St. New Orleans, La., 70119, with motor pulley APB15L050BF-375, by Automation Direct, 3505 Hutchinson Rd., Cumming, Ga., 30040, and axle pulley, APB21L050BF-500 by Automation Direct, 3505 Hutchinson Rd., Cumming, Ga., 30040)
18 oven controller (such as 16-33-LV by Dwyer-Love, 102 Indiana Hwy. 212, Michigan City, Ind. 46360 USA)
19 supply line for underfloor burner solenoid gas valve (such as 0.25 inch (6.35 mm) stainless steel tubing)
20 solenoid gas valve for underfloor burner (such as 4EKT6, by Asco, supplied by Grainger Industries, 601 S. Galvez, St. New Orleans, La., 70119)

21 bypass gas line for underfloor burner solenoid valve (such as 0.25 inch (6.35 mm) stainless steel tubing)
22 manual needle valve for underfloor burner solenoid valve bypass gas line (preferably 850-BRF-SP, by Tejas Smokers, 4747 Darien St., Houston, Tex., 77028-5915 USA)
23 manual needle valve (preferably 850-BRF-SP, by Tejas Smokers, 4747 Darien St., Houston, Tex., 77028-5915 USA)
24 fitting for gas supply for oven (Such as 49-6B, by Tejas Smokers, 4747 Darien St., Houston, Tex., 77028-5915 USA)
25 bypass gas line for dome burner solenoid valve (preferably 0.25 inch (6.35 mm) stainless steel tubing, 89895K724 by McMaster-Carr, 1901 Riverside Pkwy., Douglasville, Ga., 30135-3150)
26 solenoid gas valve for dome burner (Such as 4EKT6, by Asco, supplied by Grainger Industries, 601 S. Galvez, St. New Orleans, La., 70119)
27 supply line for dome burner solenoid valve (preferably 0.25 inch (6.35 mm) stainless steel tubing, 89895K724 by McMaster-Carr, 1901 Riverside Pkwy., Douglasville, Ga., 30135-3150)
28 manual needle valve for dome burner solenoid valve bypass gas line (preferably 850-BRF-SP, by Tejas Smokers, 4747 Darien St., Houston, Tex., 77028-5915 USA)
29 manual needle valve for dome burner solenoid valve gas supply line (preferably 850-BRF-SP, by Tejas Smokers, 4747 Darien St., Houston, Tex., 77028-5915 USA)
30 dome burner (preferably made of 1.25 inch (31.75) outer diameter round stainless steel pipe with an inner diameter of 1 inch, (2.54 cm))
31 flame and hot combustion gas from dome burner
32 arrow depicting coolest hot combustion gas flowing out from underfloor chamber
33 oven walls (preferably standard 12 gauge (0.109 inches, 2.768 mm) stainless steel plate)
34 oven controller for dome (such as 16-33-LV by Dwyer-Love, 102 Indiana Hwy. 212, Michigan City, Ind. 46360 USA)
35 arrow depicting the hottest of combustion gas leaking out around the edge of the oven floor plate
36 thermocouple for dome burner system (preferably XCIB-J-5-2-3 by Omega, 1 Omega Dr. PO Box 4047, Stamford Conn., 06907-0047)
37 insulation material (preferably mineral wool, such as supplied by Industrial Insulation, 2101 Kenmore Ave, Buffalo N.Y., 14207)
38 oven walls (preferably refractory material, such as PLICAST HymorKK 55 lbs TSR Plus Castable Refractory, TFL Houston)
39 perimeter walls for underfloor support (preferably refractory material, such as PLICAST HymorKK 55 lbs TSR Plus Castable Refractory, TFL Houston)
41 rotating Venturi bell (preferably HPGX-1, by Tejas Smokers, 4747 Darien St., Houston, Tex., 77028-5915 USA)
42 fixed position Venturi bell (preferably HPGX-1, by Tejas Smokers, 4747 Darien St., Houston, Tex., 77028-5915 USA)
43 fixed position fuel gas jet (preferably that supplied as part of HPGX-1, by Tejas Smokers, 4747 Darien St., Houston, Tex., 77028-5915 USA)
43 drive belt (such as timing belt provided by Goodyear, 200 Innovation Way, Akron, Ohio, 44316-00001)
45 rotating hollow axle (preferably made of 1.25 inch (31.75 mm) outer diameter round stainless steel pipe with an inner diameter of 1 inch, (2.54 cm))
46 circular rotating underfloor burner integral with carousel underfloor support structure (not shown)(preferably made of 12 gauge (0.109 inches, 2.768 mm) stainless steel plate)
47 metal channel, constructed to receive refractory material underfloor support structure supports
48 refractory supports for refractory underfloor support structure, or carousel (not shown) (preferably made of PLICAST HymorKK 55 lbs TSR Plus Castable Refractory, TFL Houston)
49 lowermost portion of cylindrical refractory carousel underfloor support structure, supported by refractory supports
50 baking surface
51 track bearing assembly, holding drum in alignment and supporting the refractory carousel, or underfloor support structure (preferably be fabricated using 0.5 inch (12.7 mm) diameter ball bearings, as shown, by BC Precision, 2628 Broad Street, Chattanooga, Tenn., 37408 or by using crown roller bearings, PAC 3016 by PLC Linear, supplied by Grainger Industries, 601 S. Galvez St. New Orleans, La., 70119)
52 wall of cylindrical drum underfloor support structure (preferably steel), supported and aligned by track bearings, open at the top and at the bottom, supporting refractory material component of drum underfloor support structure
53 pedestal (preferably made of standard 12 (0.109 inches, 2.768 mm) gauge stainless steel)
54 fixed base of oven (preferably made of any metal or refractory or other structural elements)
55 horizontal support plate (preferably made of standard 12 gauge (0.109 inches, 2.768 mm) stainless steel)
56 supply pipe for dome burner (preferably made of 1.25 inch (31.75) outer diameter round stainless steel pipe with an inner diameter of 1 inch, (2.54 cm))
57 drive motor and gear box (Such as 2L006 by Grainger 601 S. Galvez St. New Orleans, La., 70119 Grainger 601 S. Galvez St. New Orleans, La., 70119)
58 floor of firebox (preferably standard 12 gauge (0.109 inches, 2.768 mm) stainless steel)
59 fixed Venturi bell for underfloor burner
60 control wire for dome controller
61 control wire for underfloor controller
62 thermocouple wire for dome thermocouple
63 window for baking chamber access
64 fixed gas jet for underfloor burner
65 hollow pipe for underfloor burner
100 a preferred embodiment of the solid axle oven of the present invention
101 baking chamber
102 firebox (preferably made of 12 gauge stainless steel (0.109 inches, 2.768 mm))
103 underfloor chamber
200 a preferred embodiment of the hollow axle oven of the present invention
202 cabinet or oven skin
210 wheel (such as 4.00-6 by Harbor Freight, 91 West Bank Expressway, STE 340, Gretna, La. 70053)
212 foot peg (preferably made of 1.5 inch (38.1 mm), 0.25 inch (6.35 mm) wall thickness square aluminum tubing)
214 handle (preferably made of 1 inch round aluminum tubing)
300 a preferred embodiment of the rotating drum oven of the present invention
302 cabinet or oven skin 310 wheel, such as H760-21/2PS rotating castor wheels by Casters of Jackson, 315 Hwy. 80 West, Jackson, Miss., 39201
312 electrical switch plate
318 oven controller for underfloor burner
322 controller (preferably a logic controller that s able to switch automated start and stop sequences and safety controls, such as FT1A-C12RA-B by IDEC, as supplied by Allied Electronics, 7151 Jack Newell Blvd. S. Fort Worth Tex. 7611, USA)
324 start and stop buttons (such as OMPBD7P-F4PX01 by Omega, One Omega Dr. PO Box 4047 Stamford Conn., 06907-0047, USA)
326 light switch
334 oven controller for dome burner
400 a preferred embodiment of the food truck oven of the present invention
402 cabinet or oven skin
410 counter (existing structure)
412 back wall of oven
414 under floor support structure (preferably made of refractory material, such as stainless steel)
416 control line for infrared sensor
418 track for track bearings (preferably made of 12 gauge stainless steel plate (0.109 inches, 2.768 mm))
500 a preferred embodiment of the catering oven of the present invention
502 cabinet or oven skin or shell (preferably 12 gauge aluminum sheet (0.0808 inches, 2.052 mm thickness) or 18 gauge stainless steel sheet (0.050 inches, 1.27 mm))
600 preferred embodiment of the fixed location oven of the present invention
602 cabinet or oven skin
900 metal pizza screen (such as 14 inch metal pizza screen as supplied by Restaurant Depot 1111 S. Broad St New Orleans, La., 70125)
903 barrier plate (May be 16 gauge 0.0625 inches (1.59 mm) steel sheet)
905 baffle (May be 16 gauge 0.0625 inches (1.59 mm) steel sheet)
906 flue
908 actuator (may be a linear actuator like 6509K83 by McMaster Carr; or DC motor like 6627T38 by McMaster Carr, driven by a stepper motor driver like 6627T41 by McMaster Carr, 1901 Riverside Parkway, Douglasville, Ga., 30135-3150)
910 solid fuel
912 baffle for firebox
914 actuator for firebox baffle
915 solid fuel oven
917 arrows depicting heat form baking surface
918 gas jet
920 arrow showing movement of the baffle
922 arrow showing movement of the baffle
924 arrow showing movement of actuator
925 lines depicting heat from solid fuel
926 side port
930 burner for dome
931 flame from dome burner
932 arrow showing hot air from underfloor burner
933 arrow showing hot air from underfloor burner
952 baffles for dome
954 actuator for dome baffles
960 gas turbine
962 lines showing heat from gas jets All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A small, lightweight oven comprising:
   (a) a baking chamber;
   (b) two heat sources;
   (c) a first means for measuring temperature and a second means for measuring temperature;
   (d) a first means for controlling temperature; and,
   (e) a second means for controlling temperature;
   wherein, the baking chamber comprises a top, and a rotating floor, wherein the rotating floor serves as a baking surface within the baking chamber, wherein the rotating floor is between 12 inches and 30 inches in diameter, and ¼ inch to 1 inch in thickness, wherein the baking surface has a center and rotates about its center on an axle, and wherein at least one of the heat sources is located under the floor of the baking chamber, and wherein at least one of the means for measuring temperature is an infrared sensor located in a cool environment under and outside of the baking chamber;
   further comprising an underfloor chamber, the underfloor chamber defined at the top by the floor of the baking chamber, and on the sides by walls, and on the bottom by an opening defined by the lower edge of the walls on the sides, or by a bottom surface; wherein
   one of the heat sources is located in or under the underfloor chamber, and one of the heat sources is located in or under the top of the baking chamber; wherein
   the first means for measuring temperature measures the temperature of the top of the baking chamber, and the second means of measuring temperature measures the temperature of the bottom surface of the rotating floor; and
   the oven has two means for controlling temperature, wherein the heat source located in or under the underfloor chamber is controlled by a first means of controlling temperature, and the heat source located in or under the top of the baking chamber is controlled by a second means of controlling temperature.

2. The oven of claim 1 wherein the axle is hollow.

3. The oven of claim 1, further comprising a light source and a light shaft, wherein the light source is located outside of and under the baking chamber, and the light shaft directs the light into the baking chamber.

4. The oven of claim 1, further comprising oven walls, the oven walls defining the sides of the baking chamber, and having an opening for placing food in and removing food from the baking chamber; wherein the oven further comprises an outer oven wall and insulation material wherein the outer oven wall is outside of baking chamber, and the insulation material is located between the baking chamber walls, and the outer oven walls.

5. The oven of claim 4 wherein the oven walls and or top of the baking chamber are made of refractory materials.

6. The oven of claim 1 wherein the floor of the baking chamber is supported by a hollow cylindrical drum, the drum having a central axis, wherein the drum and baking chamber floor rotate around a central vertical axis and at least one of the at least one heat sources that is fixed inside the drum and under the baking chamber floor.

7. The oven of claim 6 wherein there are two heat sources, and one of the heat sources is located inside of or below the drum.

8. The oven of claim 6 further comprising oven walls and an outer cabinet that houses oven parts, the oven walls defining the sides of the baking chamber and having an opening allowing access to the baking chamber, and the oven having insulation material that is located between the outer cabinet and the oven walls.

9. The oven of claim 8 wherein the outer cabinet has a bottom surface that extends horizontally under bottom components of the oven, and further comprising two or more wheels, the wheels located on the bottom surface of the cabinet.

10. The oven of claim 9 wherein the top of the baking chamber is movable allowing the top of the baking chamber to be moved to an open position or a closed position, wherein the open position exposes the baking chamber to outside elements, and wherein the closed position covers the baking chamber from outside elements.

11. The oven of claim 1 wherein the floor of the baking chamber can be moved vertically to higher or lower positions relative to the top of the baking chamber.

\* \* \* \* \*